US011530636B2

(12) United States Patent
Griswold et al.

(10) Patent No.: US 11,530,636 B2
(45) Date of Patent: Dec. 20, 2022

(54) ENGINE EXHAUST HEAT MANAGEMENT SYSTEM

(71) Applicant: Kohler Co., Kohler, WI (US)

(72) Inventors: Robert A. Griswold, Kohler, WI (US); David Hasler, Kohler, WI (US); Brittany Nicole Tremblay, Hattiesburg, MS (US); Sean Leroy Winter, Waldo, WI (US); Christopher Wolf, Port Washington, WI (US); Alexander Anthony Yosick, Howards Grove, WI (US)

(73) Assignee: KOHLER CO.

( * ) Notice: Subject to any disclaimer, the term of this patent is extended or adjusted under 35 U.S.C. 154(b) by 0 days.

(21) Appl. No.: 17/313,382

(22) Filed: May 6, 2021

(65) Prior Publication Data
US 2021/0348533 A1 Nov. 11, 2021

Related U.S. Application Data

(60) Provisional application No. 63/020,946, filed on May 6, 2020.

(51) Int. Cl.
F01N 3/05 (2006.01)
F01N 13/10 (2010.01)
F01P 1/02 (2006.01)
F01P 1/06 (2006.01)

(52) U.S. Cl.
CPC ............. F01N 3/055 (2013.01); F01N 13/10 (2013.01); F01P 1/02 (2013.01); F01P 1/06 (2013.01); F01N 2240/20 (2013.01); F01P 2001/023 (2013.01)

(58) Field of Classification Search
CPC ............. F01N 2590/06; F01N 2240/20; F01N 13/002; F01N 3/05; F01N 1/08; F01N 2260/20; F01N 3/2892; F01N 3/02
See application file for complete search history.

(56) References Cited

U.S. PATENT DOCUMENTS 5,031,591 A * 7/1991 Shinoda .................. F02B 75/16
123/90.15
5,451,728 A * 9/1995 Chandler .............. F01N 13/002
181/231

(Continued)

Primary Examiner — Long T Tran
(74) Attorney, Agent, or Firm — The Belles Group, P.C.

(57) ABSTRACT

A heat management system for air-cooled engines suitable to power yard care equipment or vehicles. The system may generally comprise an engine, a blower configured to blow ambient cooling air across the engine, and an exhaust system comprising an exhaust header and a muffler. The exhaust header has an inlet end which receives heated exhaust gas from the engine and an outlet end fluidly coupled to the muffler. An air control baffle is configured to redirect a portion of the cooling air from the blower towards the exhaust header and the muffler to enhance cooling the exhaust system. The system may further include an outermost protective shield exposed to equipment operators and an inner heat barrier or shield located between the muffler and protective shield. The system is designed to ameliorate both radiative and convective sources of heat transfer to maintain the protective shield at temperatures below established industry standards.

19 Claims, 35 Drawing Sheets

(56) References Cited

U.S. PATENT DOCUMENTS

| | | | |
|---|---|---|---|
| 6,810,849 B1* | 11/2004 | Hirsch | F01M 11/067 123/196 R |
| 2003/0121722 A1* | 7/2003 | Crombeen | F01N 1/089 181/275 |
| 2005/0279318 A1* | 12/2005 | Nagel | F01M 1/04 123/196 R |
| 2007/0169989 A1* | 7/2007 | Eavenson | F02M 35/06 181/204 |
| 2009/0014236 A1* | 1/2009 | Van De Flier | F01N 1/04 181/256 |
| 2011/0308236 A1* | 12/2011 | Raasch | F01N 13/082 181/259 |
| 2017/0268416 A1* | 9/2017 | Kai | F02B 63/044 |
| 2017/0268458 A1* | 9/2017 | Hiranuma | F02F 7/007 |
| 2017/0271942 A1* | 9/2017 | Koyama | F01N 13/14 |
| 2018/0016964 A1* | 1/2018 | Ichihashi | F02B 63/04 |

* cited by examiner

ENGINE EXHAUST HEAT MANAGEMENT SYSTEM

CROSS-REFERENCE TO RELATED APPLICATIONS

The present application claims the benefit of priority to U.S. Provisional Application No. 63/020,946 filed May 6, 2020, which is incorporated herein by reference in its entirety.

BACKGROUND

The present invention generally relates to internal combustion engines, and more particularly to systems and related devices for managing heat associated with the exhaust components of air-cooled engines suitable for use with yard care equipment or vehicles.

The high temperature exhaust of combustion gas from an internal combustion engine generates a considerable amount of heat. This poses a potential burn danger to operators of engine-powered yard care equipment or vehicles such as riding mowers or tractors if the exhaust components are touched when hot. Certain industry safety standards such as ANSI/OPEI B71.1-2017 Consumer Turf Care Equipment—Pedestrian-Controlled Mowers And Ride-On Mowers define hot surface tests to measure temperatures typically recorded at exposed parts of the engine assembly and vehicle frame such as an outermost thermal barrier or shield (e.g. Browning Shield), which at least partially covers and restricts direct access to the hot exhaust components of the engine. The standard specifies a maximum surface temperature of 176 degrees F. which cannot be exceeded for the Browning Shield or adjoining portions of the vehicle frame exposed to equipment operators to prevent a potential burn hazard.

Improvements are desired to better distribute and control the heat emitted by exhaust system components of air-cooled engines to meet applicable industry safety standards.

SUMMARY

The present disclosure provides improved thermal management of heat emitted from exhaust system components of an internal combustion engine. Such exhaust components which generate heat may include the exhaust pipe or header mounted to the engine which receives the heated combustion gas from the engine and the muffler fluidly connected thereto. Other parts of the engine which generally contribute to heat generation which can further heat the exhaust components include the engine cylinder(s) wherein fuel is combusted.

The engine heat management system may include both convective and radiant heat control features which collectively contribute to better distribution and dispersion of engine exhaust-related heat to meet the foregoing applicable industry hot surface temperature standards. In one aspect, the heat management system may include all or any combination of an outermost protective shield directly exposed to equipment operating personnel, an inner thermal heat barrier or shield, an air control baffle configured to direct ambient cooling air from the blower towards the engine exhaust components, and a specially configured exhaust header muffler incorporating exhaust gas temperature control features. Aspects of each component are further described herein.

The heat management system and related components and concepts disclosed herein are adapted for use with numerous different types of air-cooled engines used in yard care vehicles or equipment powered by internal combustion engines with smaller displacements and horsepower than typical automotive engines. Some non-limiting examples include larger yard care equipment like riding mowers or tractors used to maintain turf; however, any powered vehicle or equipment utilizing such smaller scale air-cooled internal combustion engines may benefit from the heat management system and related components disclosed herein. The fuel source may be gasoline, diesel, or another liquid fuel in some implementations. The heat management system and related components are not limited in their applicability and thus the present disclosure should be broadly construed.

In one aspect, an engine exhaust heat management system comprises: an engine; a blower configured to blow ambient cooling air across the engine; an exhaust header having an inlet end configured to receive heated exhaust gas from the engine; a muffler fluidly coupled to an outlet end of the exhaust header; and an air control baffle configured to redirect a portion of the cooling air from the blower towards the exhaust header and the muffler.

In another aspect, an engine exhaust heat management system comprises: a vehicle having a frame; an engine mounted to the frame; a blower configured to blow ambient cooling air across the engine; an outermost protective shield mounted to the frame and spaced apart from the engine; an exhaust header having an inlet end mounted to the engine and configured to receive heated exhaust gas from the engine; a muffler fluidly coupled to an outlet end of the exhaust header; and an air control baffle configured to redirect a portion of the cooling air from the blower towards the exhaust header and the muffler.

In another aspect, an engine exhaust heat management system comprises: an engine; an exhaust header having an inlet end mounted to the engine and configured to receive heated exhaust gas from the engine; a muffler comprising an elongated shell defining an interior including an inlet chamber having a proximal end portion fluidly coupled to an outlet end of the exhaust header, an outlet chamber in fluid communication with the inlet chamber, and a center baffle arranged between the inlet and outlet chambers, the center baffle including an opening extending between the inlet and outlet chambers; wherein the outlet end of the exhaust header includes an extension which projects through the shell and inwards into the inlet chamber for a distance.

BRIEF DESCRIPTION OF THE DRAWINGS

The present disclosure will become more fully understood from the detailed description and the accompanying drawings, wherein like elements are labeled similarly and in which.

Figure 1:
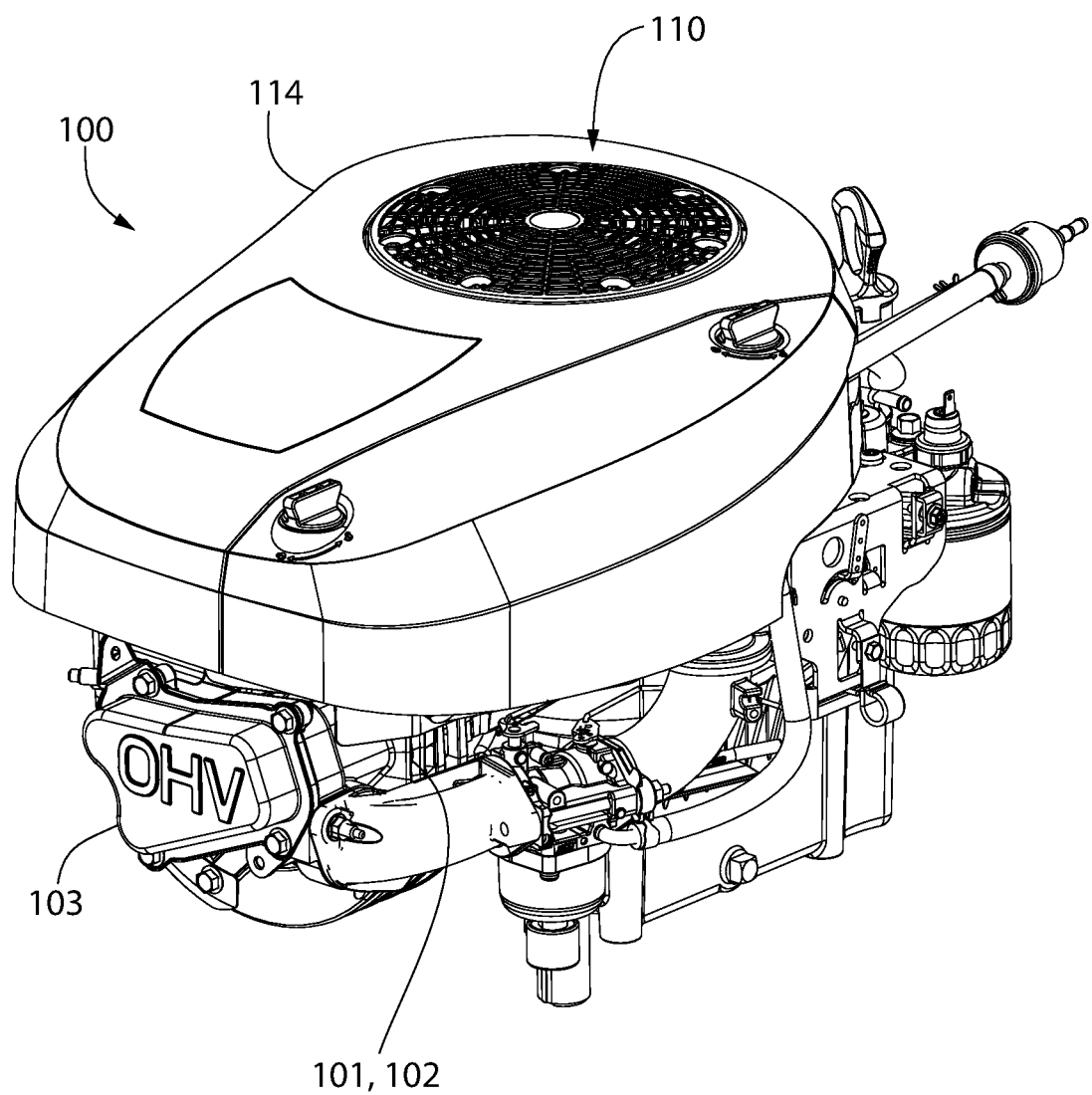
FIG. 1 is a front perspective view of an air-cooled internal combustion engine according to the present disclosure.
Figure 2:
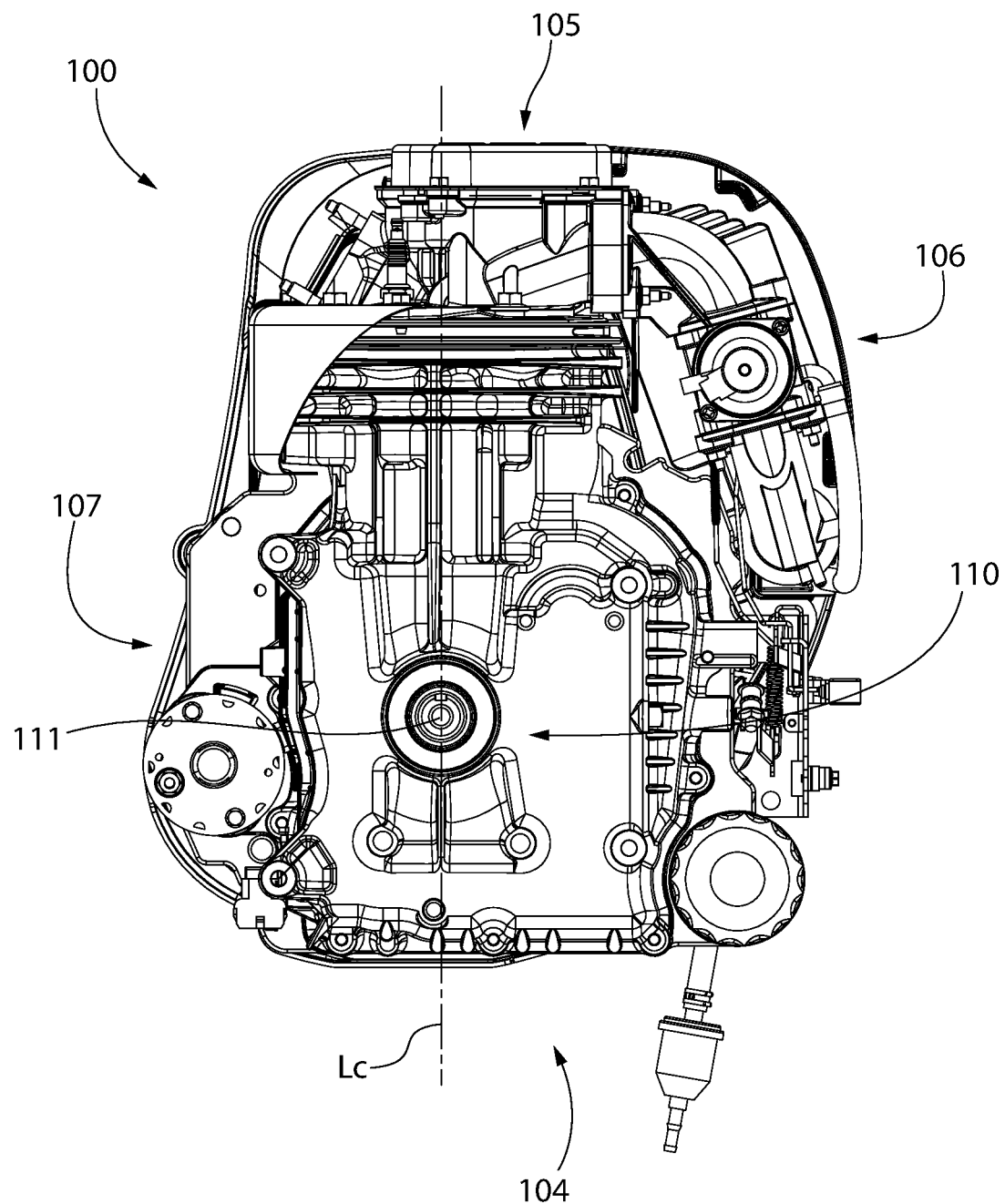
FIG. 2 is a top view thereof.
Figure 3:
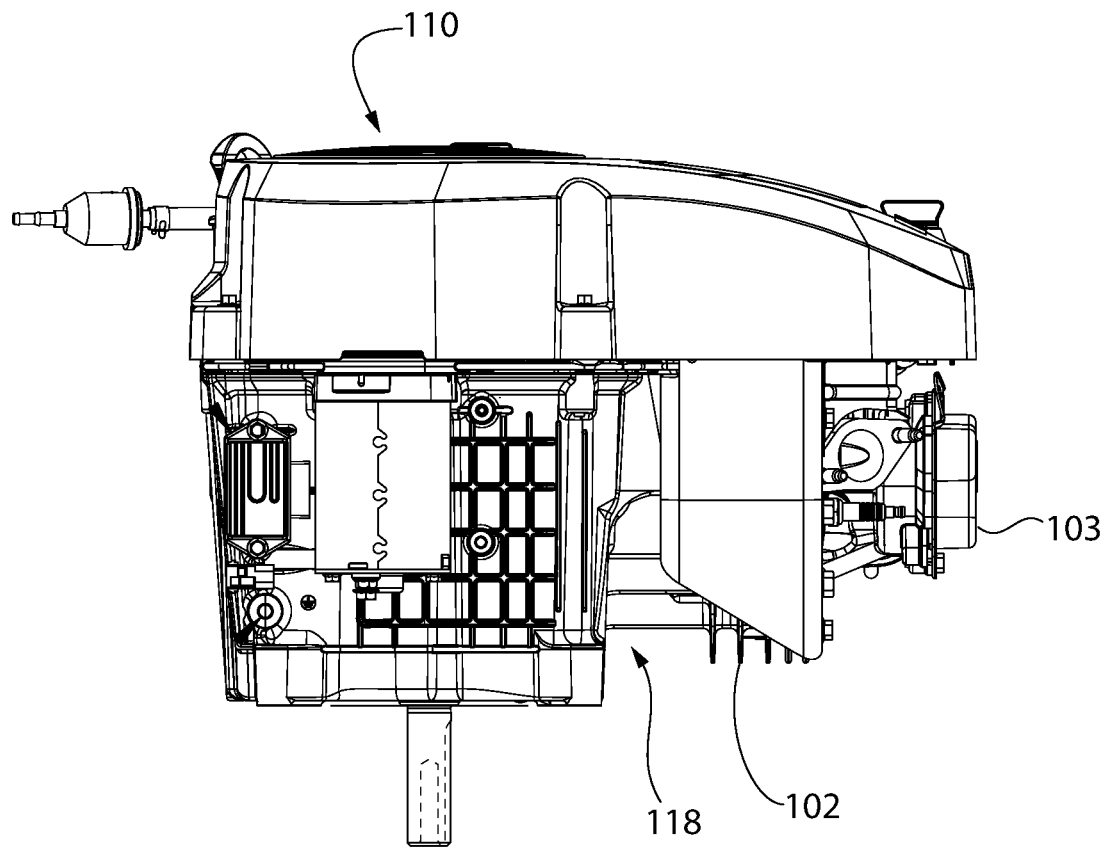
FIG. 3 is a left side view thereof.
Figure 4:
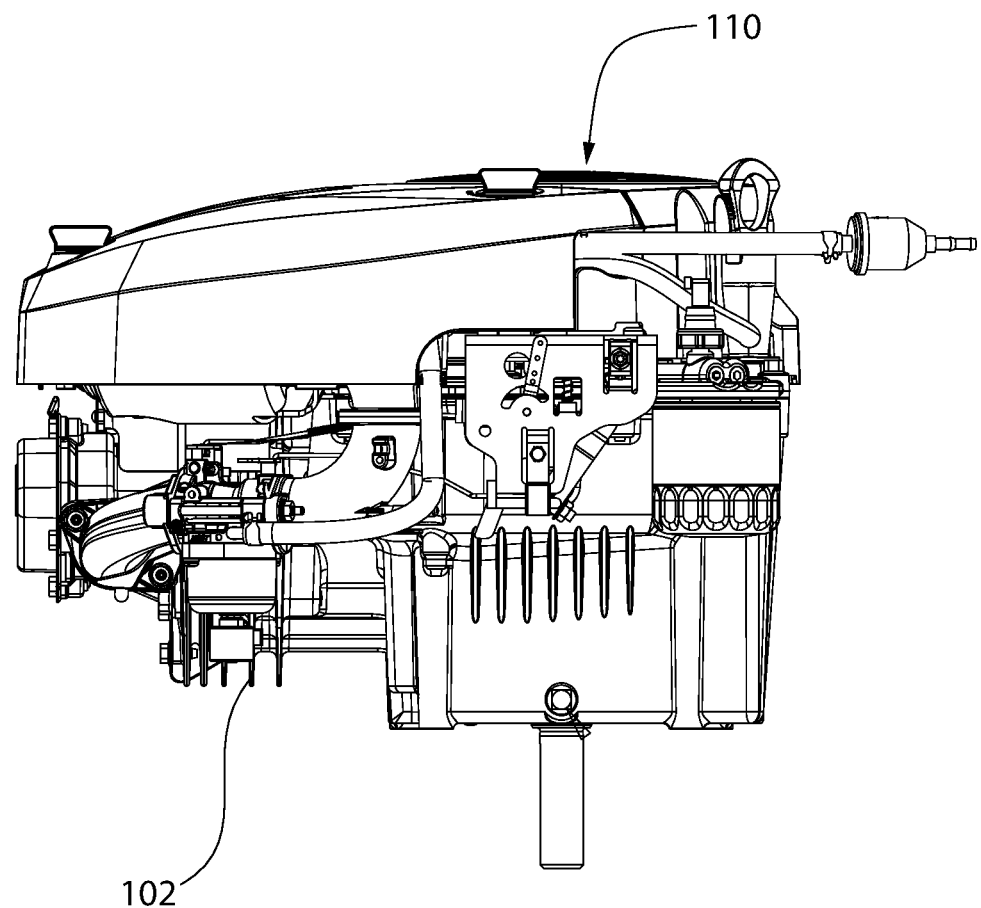
FIG. 4 is a right side view thereof.
Figure 5:
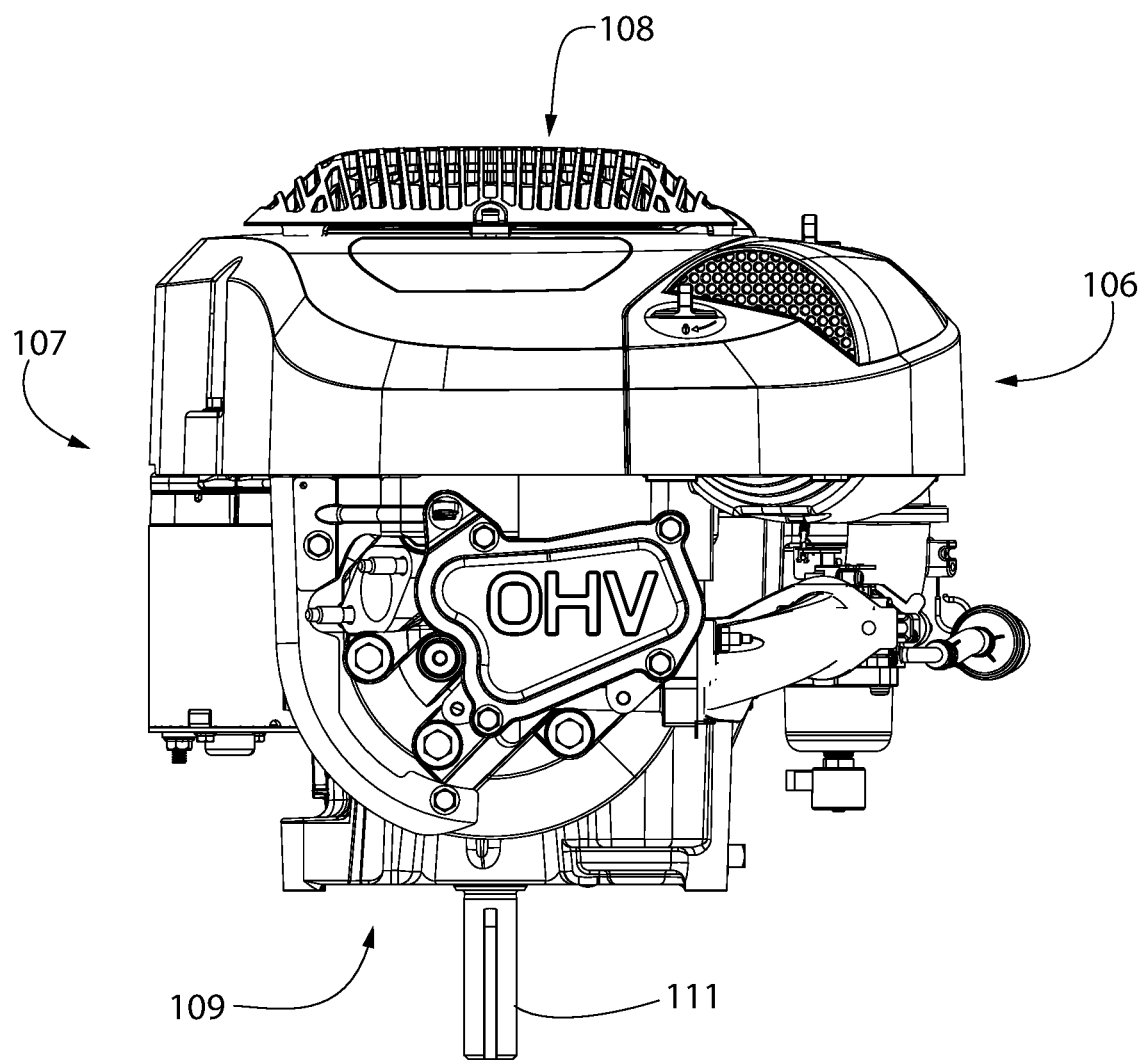
FIG. 5 is a front view thereof.
Figure 6:
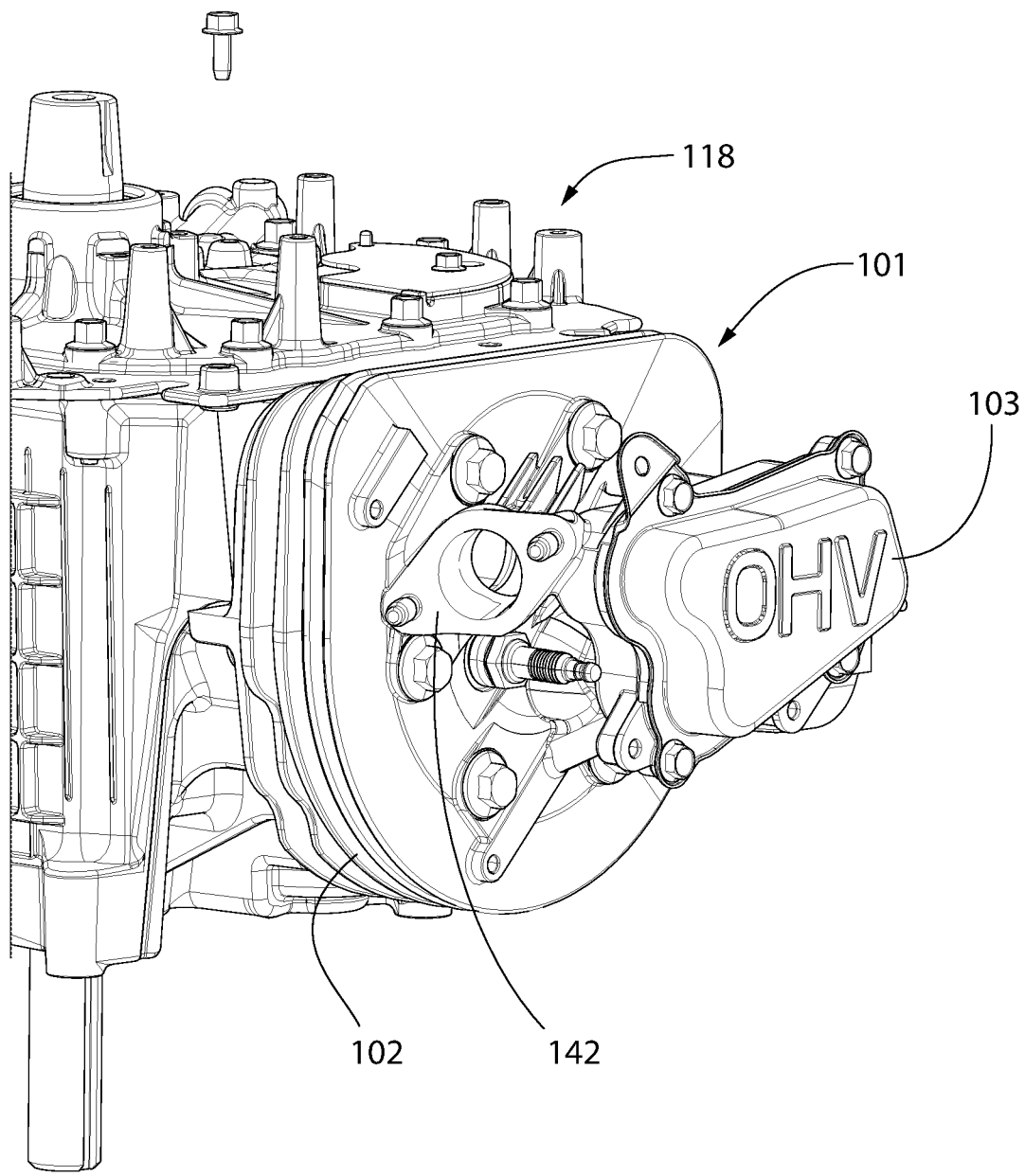
FIG. 6 is an enlarged right side perspective view with blower housing removed to show the cylinder and external cooling fins of the engine.
Figure 7:
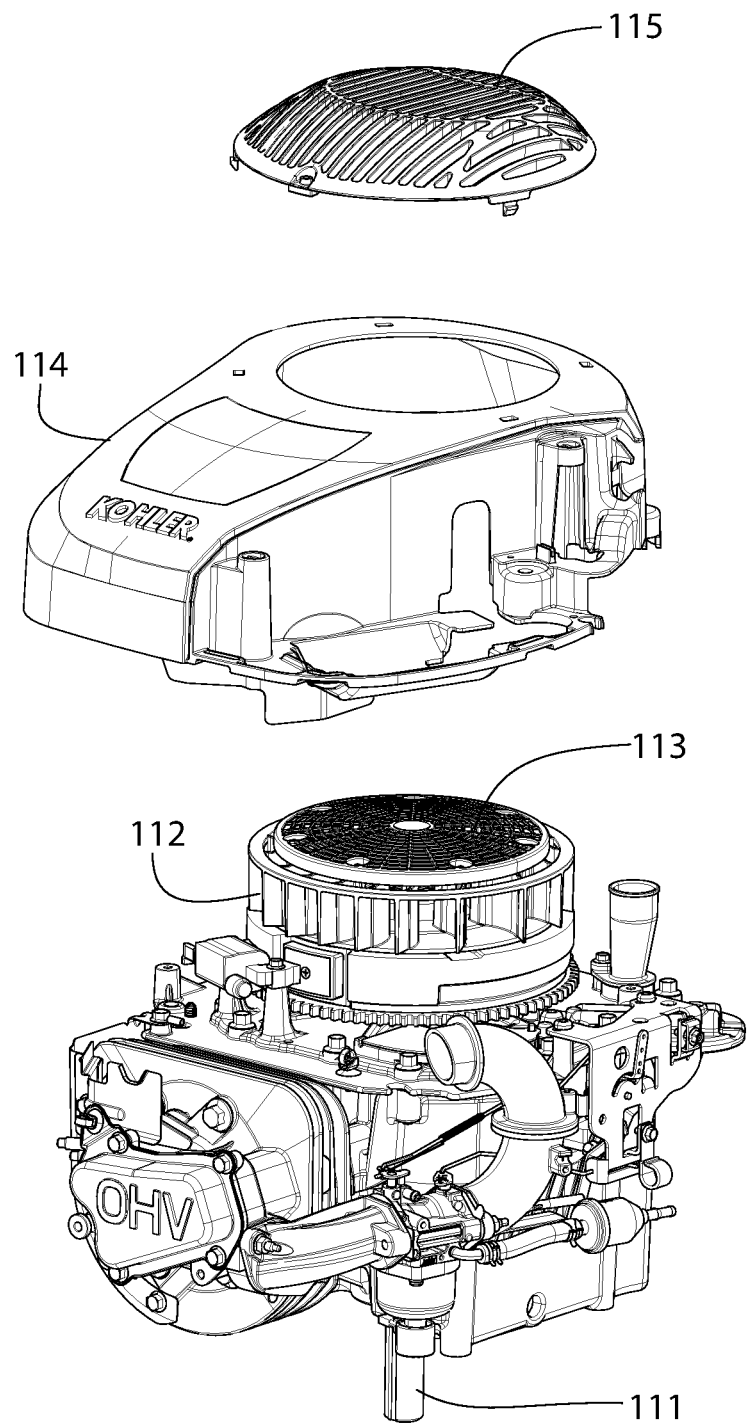
FIG. 7 is an exploded perspective view of the engine.
Figure 8:
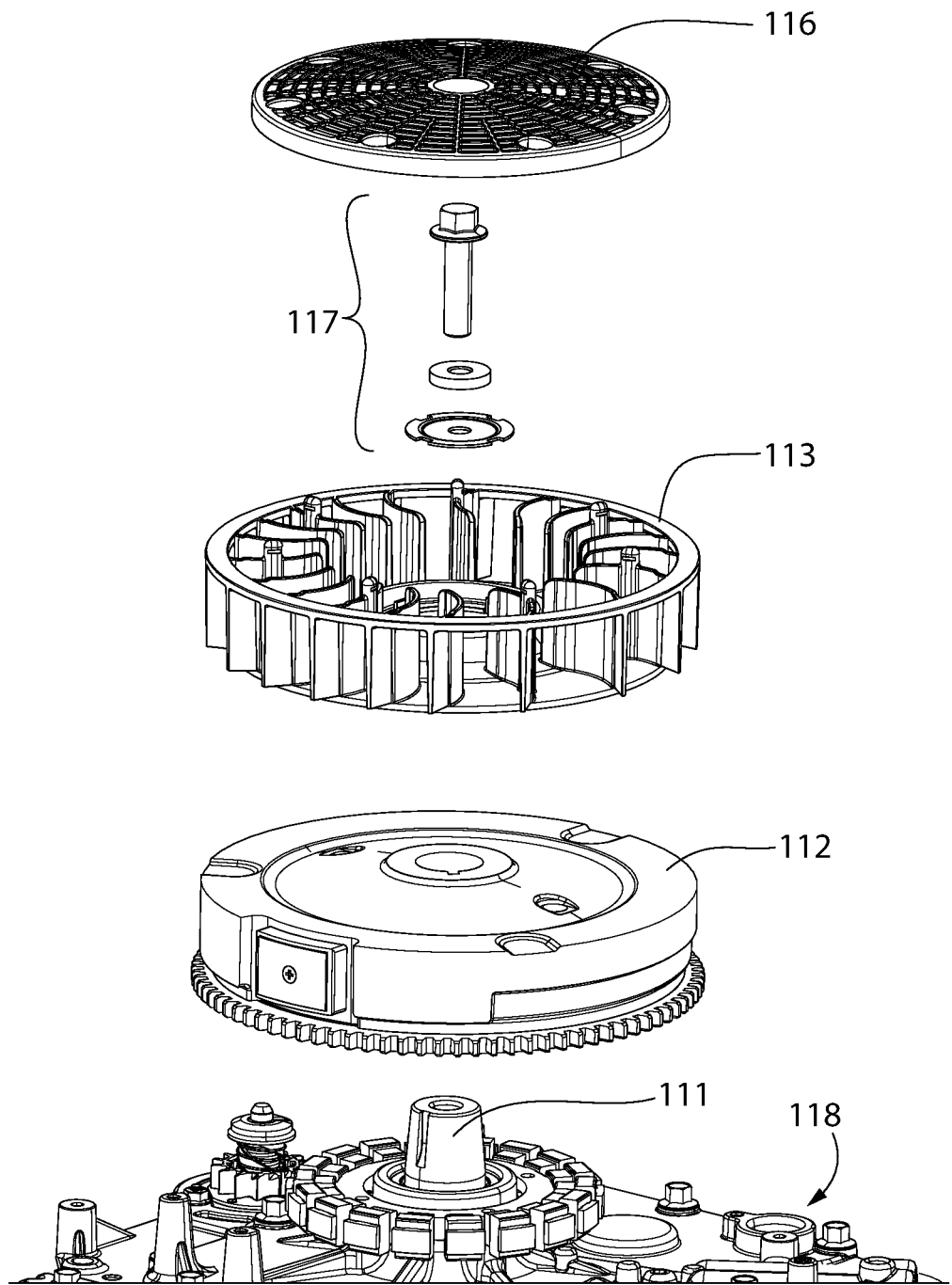
FIG. 8 is an exploded perspective view of the blower of the engine.
Figure 9:
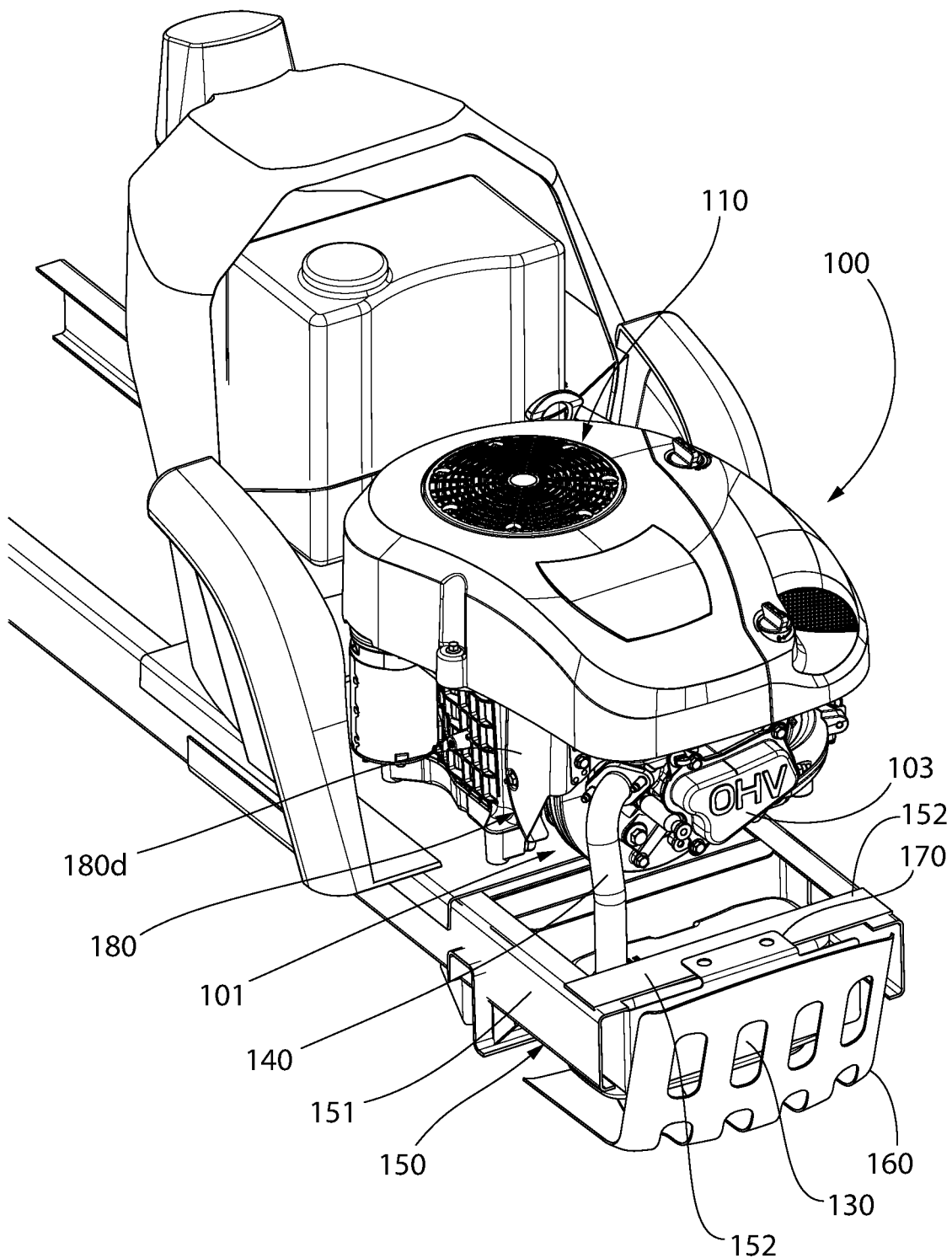
FIG. 9 is a front perspective view of a powered yard care vehicle or equipment with the installed engine and components of the engine exhaust heat management system.
Figure 10:
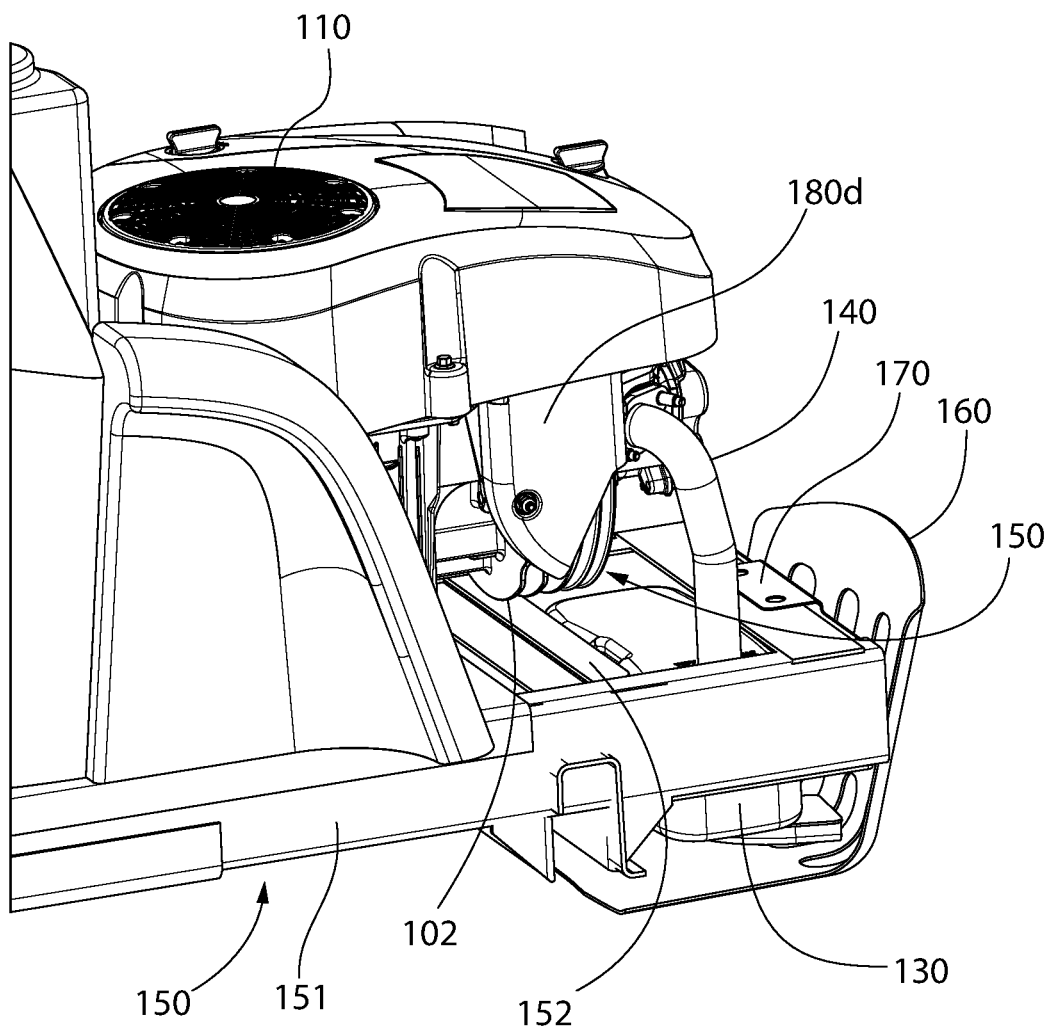
FIG. 10 is left side perspective view thereof.
Figure 11:
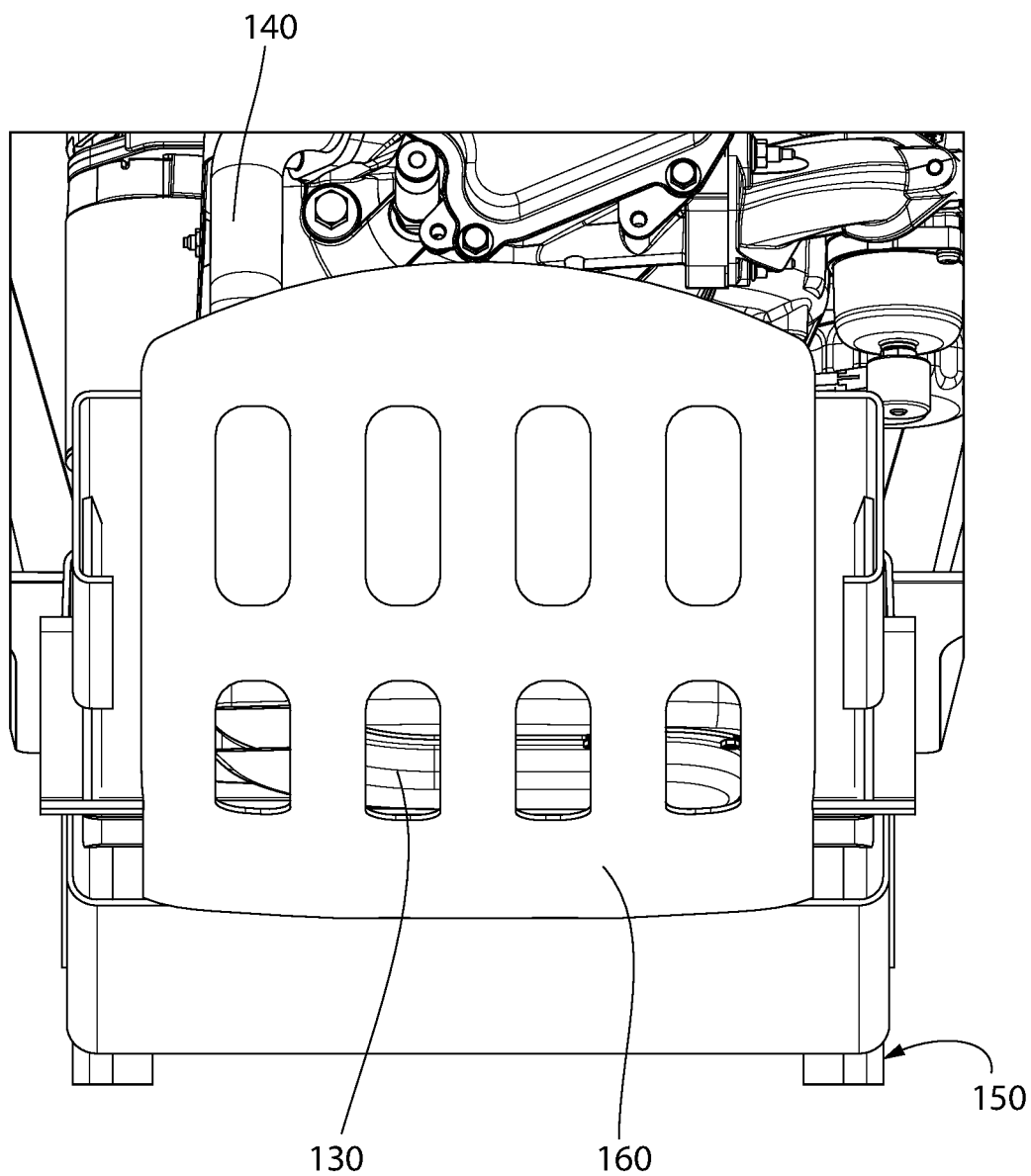
FIG. 11 is partial front view thereof.
Figure 12A:
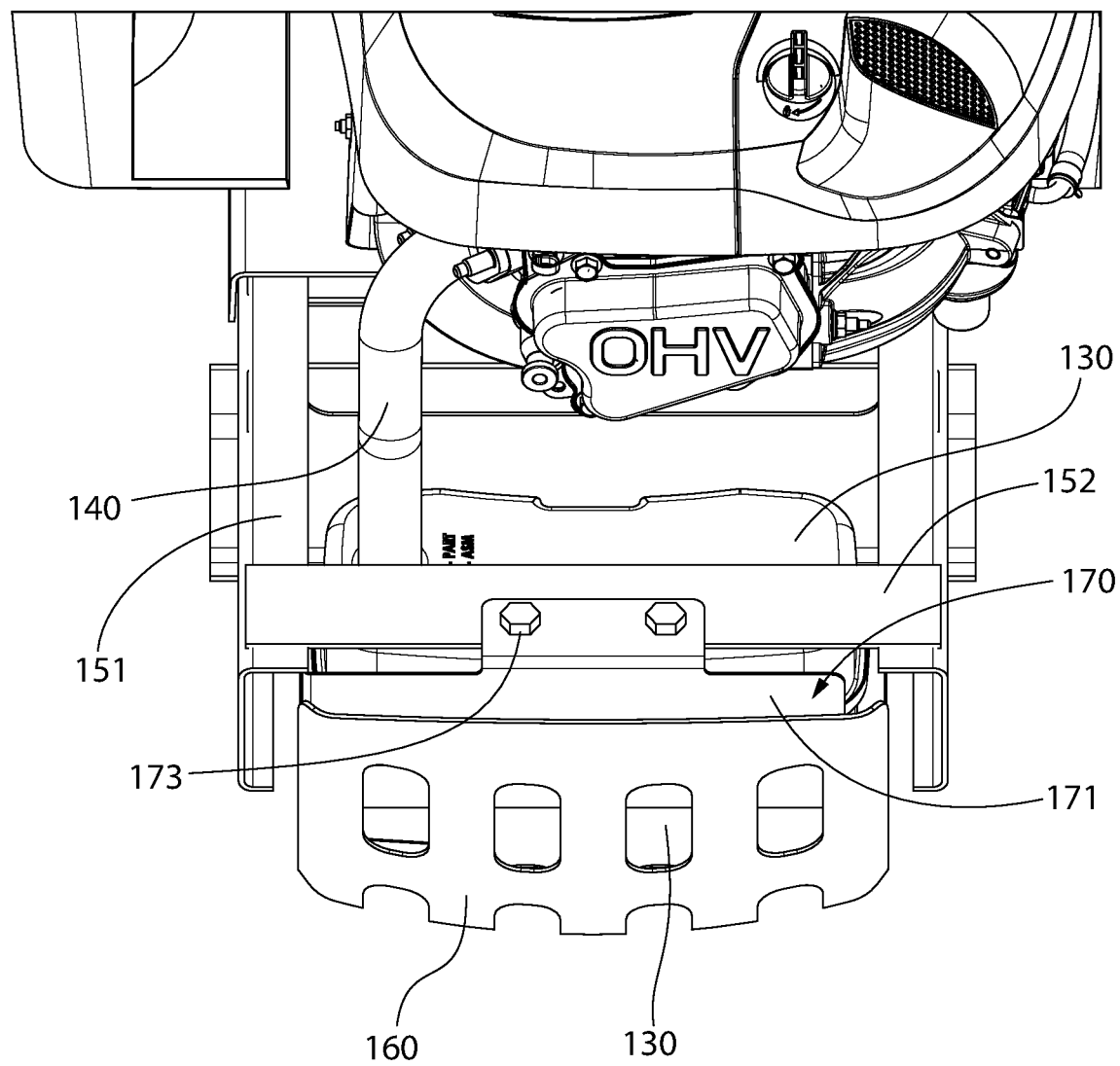
FIG. 12A is a top-down front perspective view thereof with outermost protective shield installed.
Figure 12B:
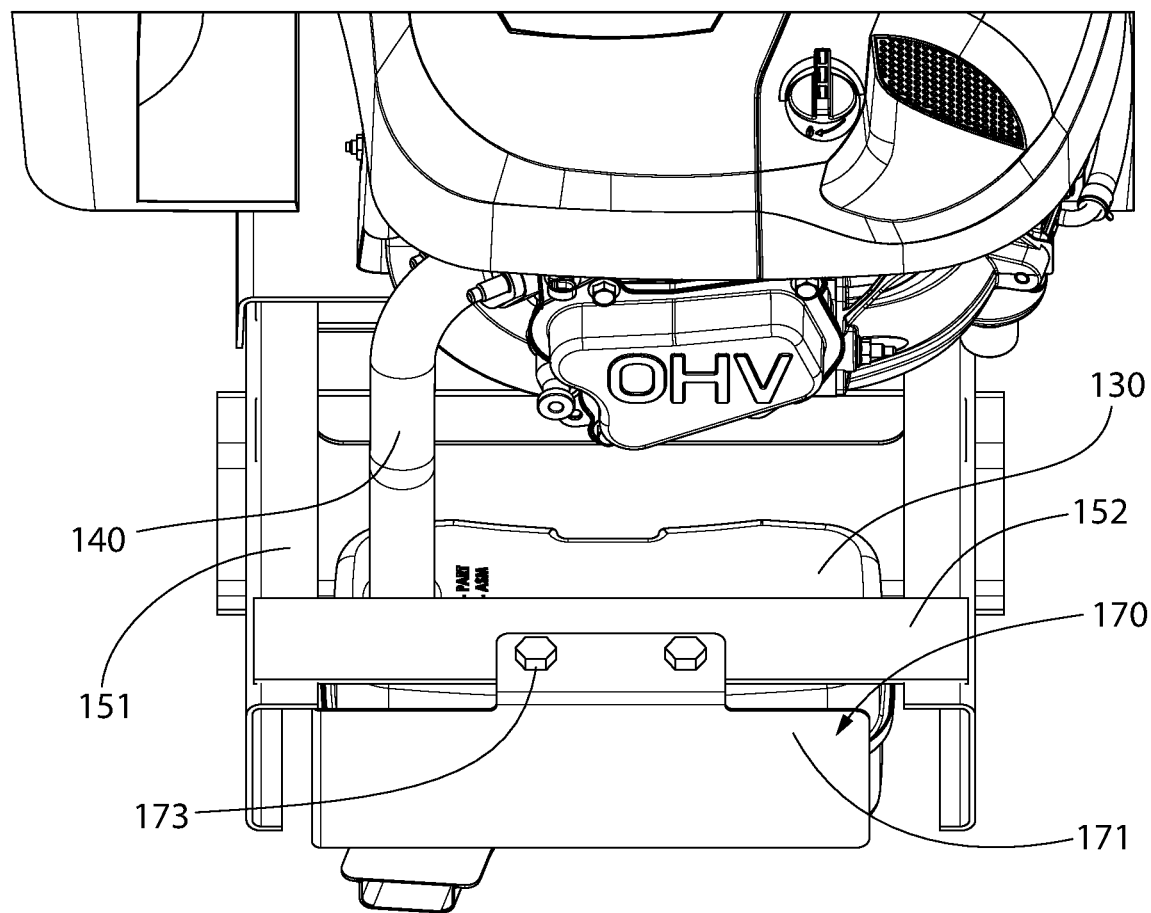
FIG. 12B is a top-down front perspective view thereof with protective shield removed.
Figure 13:
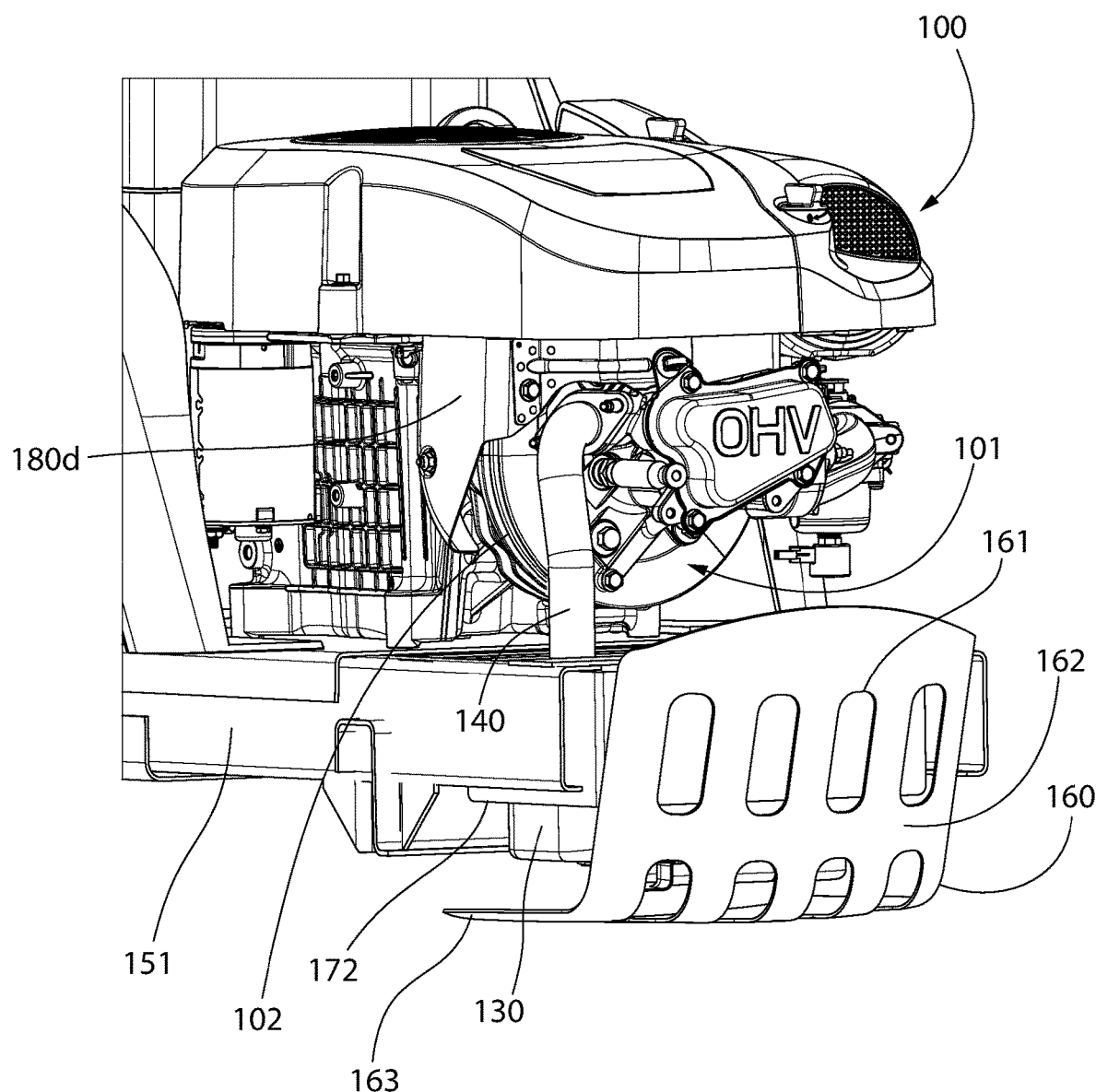
FIG. 13 is an enlarged front left perspective view of the vehicle with engine and heat management system.
Figure 14:
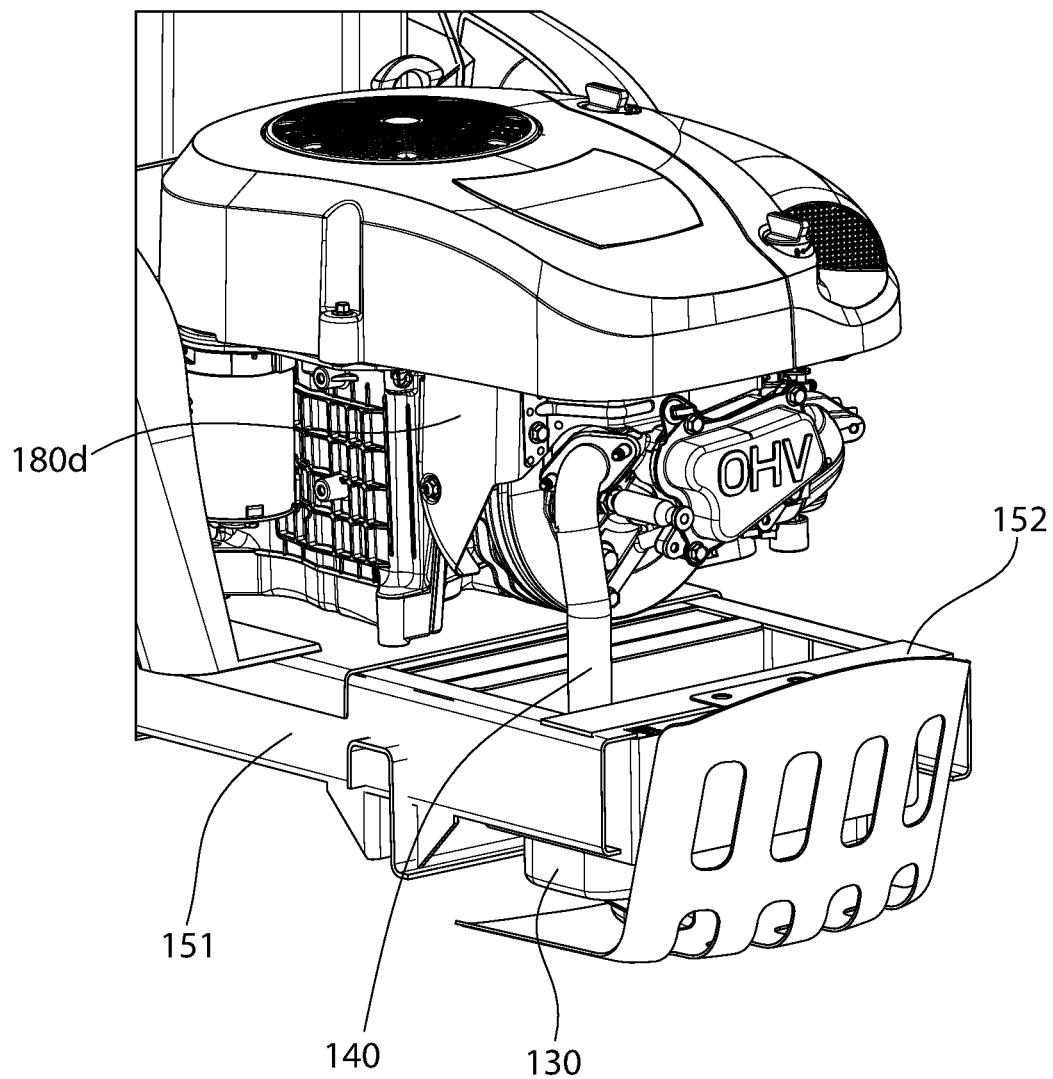
FIG. 14 is a front left perspective view thereof.
Figure 15:
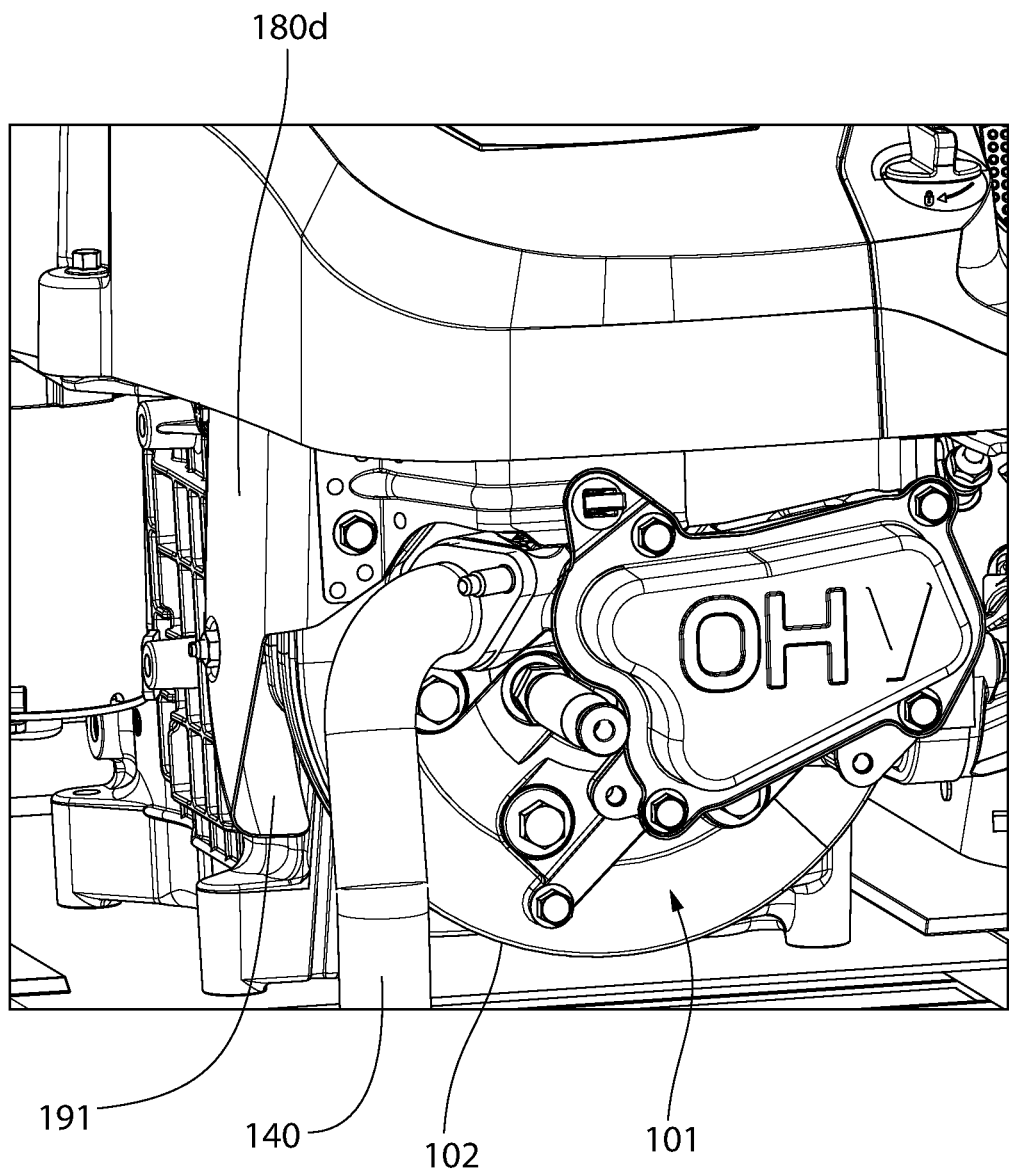
FIG. 15 is an enlarged front left perspective view showing the cylinder portion of the engine and gas exhaust header coupling arrangement.
Figure 16:
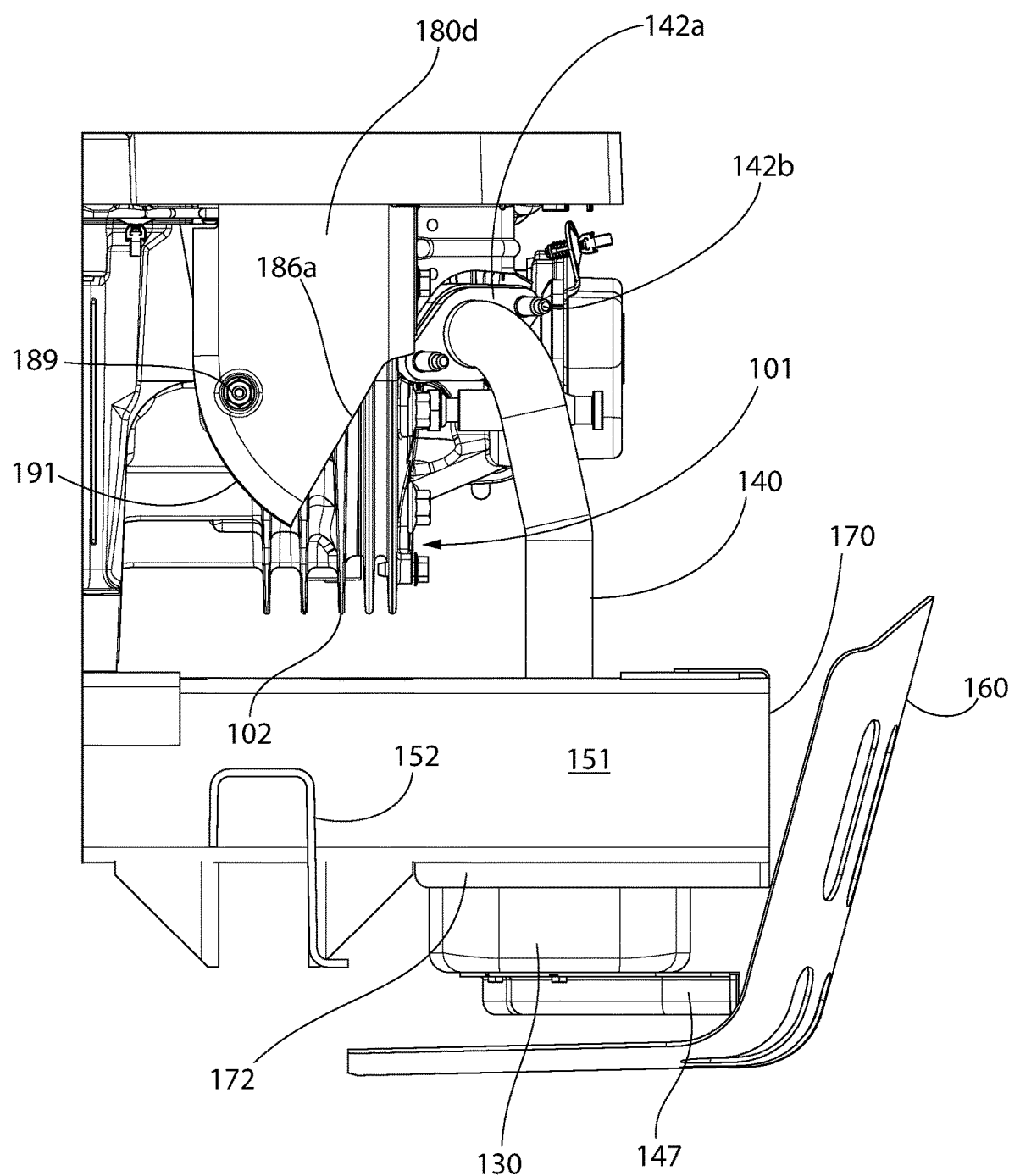
FIG. 16 is a partial left side view of the vehicle with engine and heat management system.
Figure 17:
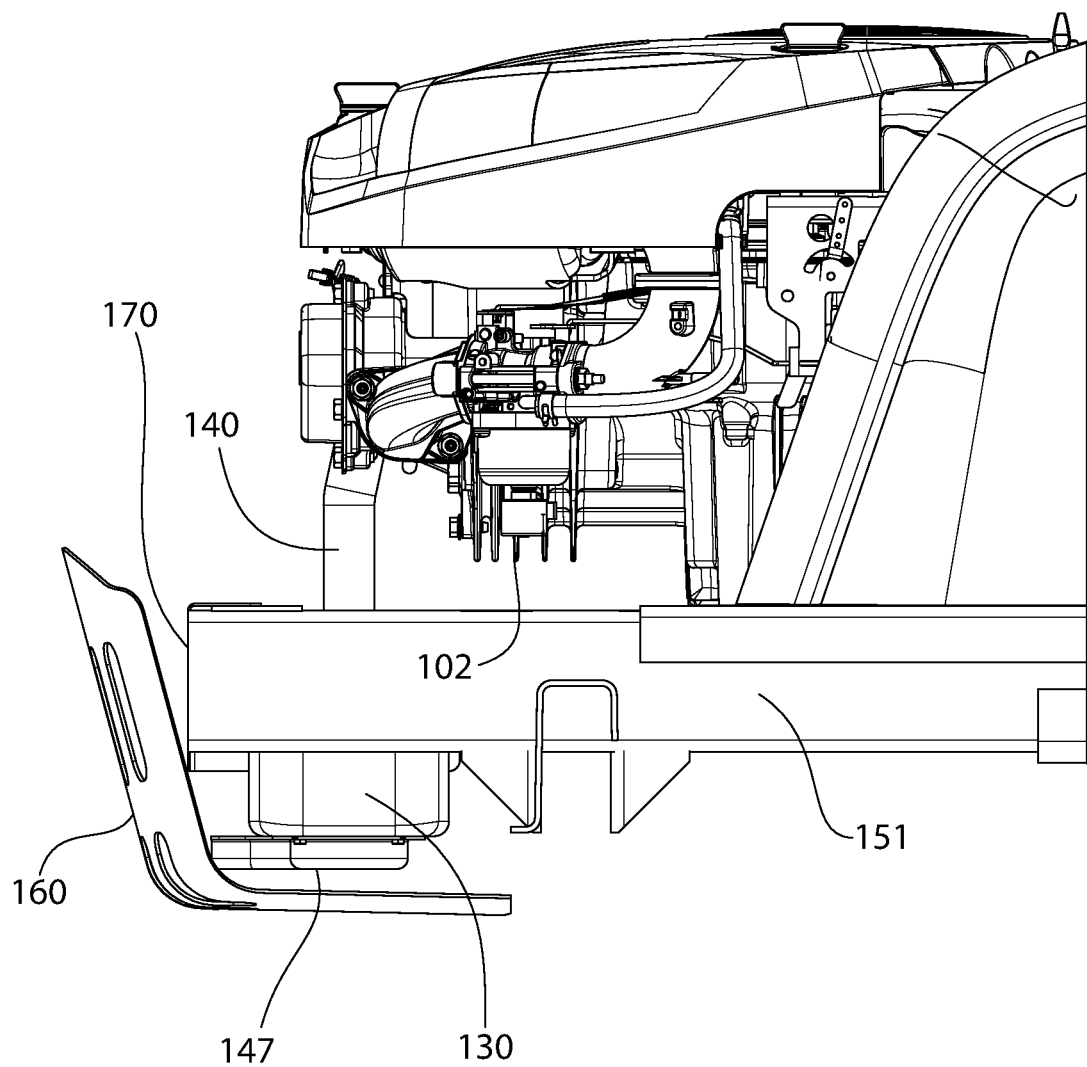
FIG. 17 is a partial right side view thereof.
Figure 18:
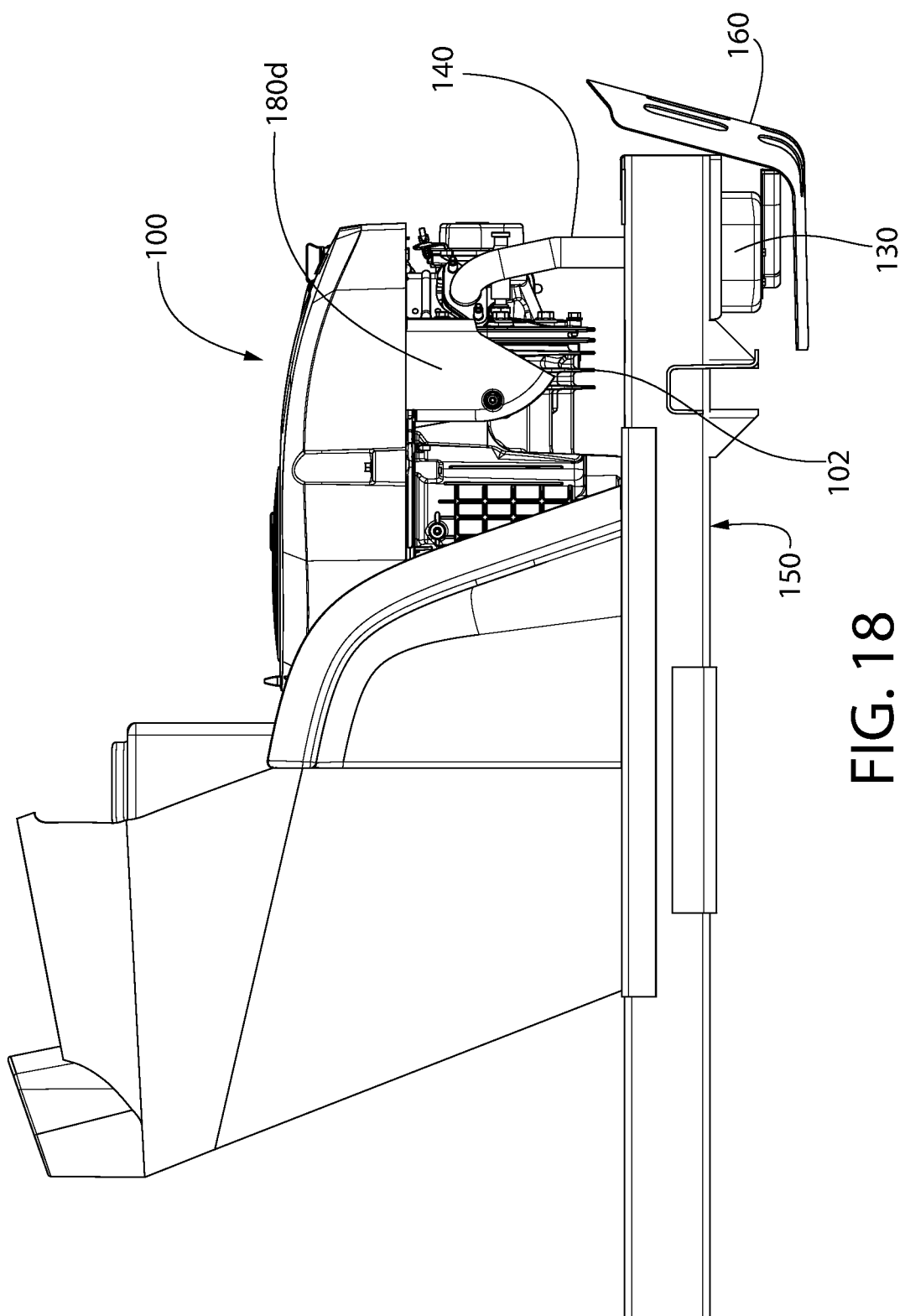
FIG. 18 is a full left side view thereof.
Figure 19:
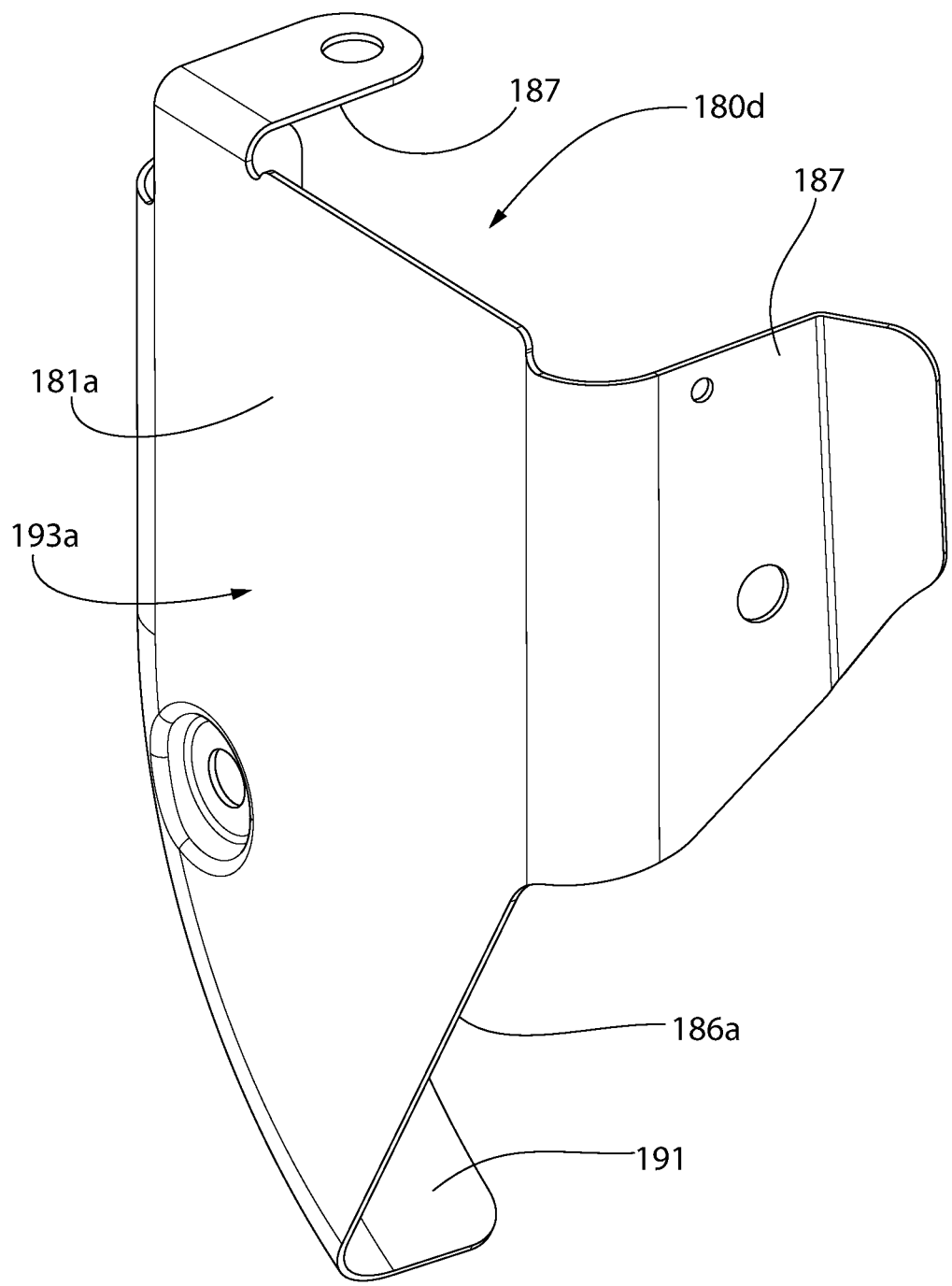
FIG. 19 is a perspective view of the air control baffle of the heat management system shown variously in FIGS. 9-18.

All drawings are schematic and not necessarily to scale. Features appearing numbered in some figures which appear un-numbered in other figures are the same features unless noted otherwise.

DETAILED DESCRIPTION

The features and benefits of the invention are illustrated and described herein by reference to non-limiting examples in which aspects of the disclosure may be embodied. This description of examples is intended to be read in connection with the accompanying drawings or photos, which are to be considered part of the entire written description. Accordingly, the disclosure expressly should not be limited to such examples illustrating some possible non-limiting combination of features that may exist alone or in other combinations of features disclosed herein.

In the description of examples disclosed herein, any reference to direction or orientation is merely intended for convenience of description and is not intended in any way to limit the scope of the present invention. Relative terms such as "lower," "upper," "horizontal," "vertical,", "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise.

As used throughout, any ranges disclosed herein are used as shorthand for describing each and every value that is within the range. Any value within the range can be selected as the terminus of the range.

A heat management system according to the present disclosure is disclosed as applied to an air-cooled internal combustion engine driven piece of yard care mowing equipment or vehicle translatable across a surface such as a tractor. As previously noted, however, the heat management system may be used with any type of engine-driven equipment or vehicle. The terms equipment and vehicle may be considered used interchangeably herein. The engine 100 may be an air-cooled single cylinder engine in one non-limiting implementation as shown. However, other engines usable with the present heat management system include multiple cylinder engines such as twin cylinder engines or those with more cylinders.

FIGS. 1-8 show the engine 100 in an unmounted condition first. Heat generation, transmission, or cooling features of engine 100 applicable to description of the present heat management system generally includes engine block 118 comprising at least one cylinder 101 configured and operable for combusting the fuel, blower 110 and the exhaust system. The exhaust system may comprise exhaust header 140 fluidly coupled at a distal outlet end to muffler 130 and to the engine block at the opposite proximal inlet end. The inlet end receives heated exhaust gas of combustion generated by the cylinder. Cylinder 101 may include a plurality of external cooling fins 102 to dissipate the heat of combustion transmitted through the cylinder walls. Valve cover 103 is shown covering the head of the cylinder which provides a point of reference on the front of the engine. Engine 100 powers a rotatable crank or drive shaft 111 which may be vertically oriented in one implementation. Drive shaft 111 may be coupled to any applicable useful tool or device such as mower blade(s) rotated by the shaft, as one non-limiting example. Any suitable fuel may be used to power engine 100, including for example without limitation liquid fuels such as gasoline or diesel.

For convenience of reference, the engine 100 may be considered to include a front side 104, rear side 105, right side 106, left side 107, top 108, and bottom 109. The right and left sides are designated from the perspective of the equipment operator facing the front of the engine. A horizontally-oriented longitudinal centerline Lc is defined as extending through the geometric center of the engine drive shaft 111.

Blower 110 may be driven directly or indirectly by drive shaft 111. Blower 110 is configured to draw in and discharge ambient cooling air past the combustion portion of the engine (i.e. cylinder 101) which generates a significant amount of heat. The blower in one non-limiting example may generally include flywheel 112, fan impeller 113 in operable coupling thereto, circular debris shield 116, outer blower cover or housing 114, and topmost fixed guard grille 115 having a plurality of airflow openings of any suitable shape for drawing ambient cooling air into the blower. Any suitable configuration of fan impeller with vanes typically used for this application may be used. The fan impeller and flywheel assembly may be detachably and fixedly coupled to a top portion of the engine drive shaft by bolting assembly 117, which may include a bolt and annular washers or plates as shown (see, e.g. FIG. 8). In operation, the fan impeller and flywheel is rotated by and with the drive shaft. Impeller 113 draws ambient air downwards through grille 115 and discharges the air in a downward direction across cylinder 101 and its cooling fins 102. This draws heat away from the cylinder to cool the engine 100.

It bears noting that the cylinder 101 and engine exhaust system (exhaust header 140 and muffler 130) which receives heated combustion gas from the engine block 118 produced by cylinder 101 transmits heat during operation of the engine. Heat is transmitted by radiation from exhaust header 140 and muffler 130 to surrounding structures of the vehicle and its frame which may pose a potential burn hazard to equipment operating personnel. The heat management system disclosed herein in one aspect utilizes ambient cooling air discharged by the blower to cool the engine exhaust system components to ameliorate the heat emitted by the muffler and engine gas exhaust header. This results in a surface temperature of the outermost protective shield being below the maximum temperature prescribed by foregoing existing industry safety standards.

FIGS. 9-18 show engine 100 and heat management system components in a mounted condition on the equipment or vehicle frame 150. FIGS. 19-34 show various aspects of the heat management system components.

Referring generally to FIGS. 9-34, equipment or vehicle frame 150 may have any suitable configuration adapted to the particular type of vehicle/equipment and function, as well as engine support. In one configuration, the frame may generally include a pair of longitudinal members 151 and plurality of cross-wise or lateral members 152 fixedly attached transversely between the longitudinal members. Longitudinal members 151 are oriented parallel to engine longitudinal centerline Lc whereas lateral members 152 are transverse or perpendicular thereto. In the present example, the engine 100 may be mounted towards the front of the vehicle frame 150 and vehicle. Muffler 130 and exhaust header 140 are mounted at the front of the vehicle. The frame members may be made of suitable strong metal and have any suitable configuration and number. Lateral frame members 152 may have the same or different configurations. Other configurations of vehicle frames including various stamped metal shapes may be used and does not limit the disclosed heat management system.

The heat management system may generally include components, devices, or apparatuses designed to reduce heating of the outermost protective shield 160 and portions of the vehicle frame 150 exposed to equipment operating personnel. The heat management system may generally include without limitation an outermost protective shield 160, an inner heat barrier or shield 170, and an air control baffle 180 which may include several configurations further described herein. A specially configured muffler 130 and exhaust header 140 is provided which optimizes cooling the engine exhaust gas to reduce heat transmitted by these components to the vehicle frame and outermost protective shield 160. Exhaust header 140 is fluidly coupled between the engine block 118 and muffler 130 to convey exhaust gas from the engine block to the muffler and then to atmosphere. Excluding the outermost protective shield, the inner components of the heat management system are cooperatively designed and collectively function to reduce the temperature of the outermost protective shield and adjoining parts of the vehicle frame to comply with the ANSI/OPEI B71.1-2017 exposed maximum surface temperature industry standard previously described herein.

The protective shield 160 is the outermost shield exposed to the ambient environment in front of the engine and exposed to the equipment operator. The outermost protective shield 160 may have any suitable configuration, including straight or angled and contoured to fit the profile of the engine, vehicle, and vehicle frame. This shield may be referred to as a Browning Shield in the art. The terms outermost protective shield and Browning Shield may therefore be used interchangeably in this disclosure. The shield may be formed of any suitable metallic material. Some designs of shield 160 may include airflow openings 161 for passing air through the shield in either an inward or outward direction. In one non-limiting design, protective shield 160 may be generally L-shaped including a vertically angled section 162 and horizontal section 163 as shown.

The inner heat barrier or shield 170 reduces radiant temperature effects of the engine exhaust system on the outermost protective shield 160 (Browning Shield) and the vehicle frame 150. The inner heat shield, which is spaced inward but apart from the outermost protective shield, may be configured for attachment to the frame 150 of the vehicle or equipment powered by the engine.

In one implementation, the inner heat shield 170 may have an angled configuration and substantially vertical orientation. The heat shield 170 may be formed of suitable metal sheet or plate bent to desired shape. Inner heat shield 170 may include at least an elongated planar transverse section 171 adjacent to but spaced apart from outermost protective shield 160. Some designs may also include one or two axially oriented contiguous planar lateral side sections 172 at the ends arranged adjacent to the vehicle frame 150 thereby creating L-shaped or U-shaped shields respectively. Section 171 may be oriented transversely such as perpendicularly to longitudinal centerline Lc of engine 100. Section(s) 172 may be axially oriented parallel to longitudinal centerline Lc. Transverse section 171 may be between the outermost protective shield 160 (e.g. Browning Shield) and the frame 150 of the vehicle to form a thermal barrier which shields the protective shield from directly receiving radiant heat emitted by the exhaust header 140 and muffler 130. The lateral side section 172 thermally protects lateral areas on the side of the vehicle frame closest and adjacent to the header and muffler which are heated thereby. The transverse and side sections may have any suitable configuration, height, and width/length sufficient to effectively shield the outermost protective shield from the radiant heat of the engine exhaust components.

In one embodiment, the inner heat shield 170 may be formed of an aluminized steel; however, other suitable metallic materials may be used. The aluminized steel functions to partially reflect radiant heat from the exhaust header and muffle back towards those components to minimize heat transmitted through the heat shield toward the outermost protective shield 160. In one implementation, the heat shield 170 may be attached to the vehicle frame 150 (e.g. forward-most transverse lateral member 152) via threaded or other type fasteners 173 and inward of the outermost protective shield (e.g. Browning Shield). The figures show the inner heat shield 170 mounted to a horizontal transverse frame member of the vehicle frame 150 at the front of the vehicle. Other shaped inner heat shields 170 may be provided depending on the vehicle frame 150 design.

The air control baffle 180 spaced inward from the inner heat shield 170 may be specially configured to redirect a portion of the ambient cooling air discharged by the blower 110 (past the engine cylinder 101) forward and towards the front of the engine and optionally the lateral side of the vehicle frame 150 in some implementation closest to the muffler 130 and exhaust header 140 which heats the vehicle frame on that side. More specifically, baffle 180 is configured to redirect the cooling air towards the muffler 130 and exhaust header 140 to cool those components. Accordingly, the blower 110 provides not only cooling air to the external cooling fins 102 on the cylinder 101 for general engine cooling, but also discharges a portion of the cooling air flow via the baffle 180 outwards towards the exhaust header 140, muffler 130, inner heat shield 170, and side vehicle frame portions for thermal management purposes. The present heat management system therefore utilizes this blower air for cooling the engine exhaust system components. Several non-limiting example configurations of the air control baffle 180 are disclosed herein for these purposes.

Figure 20:
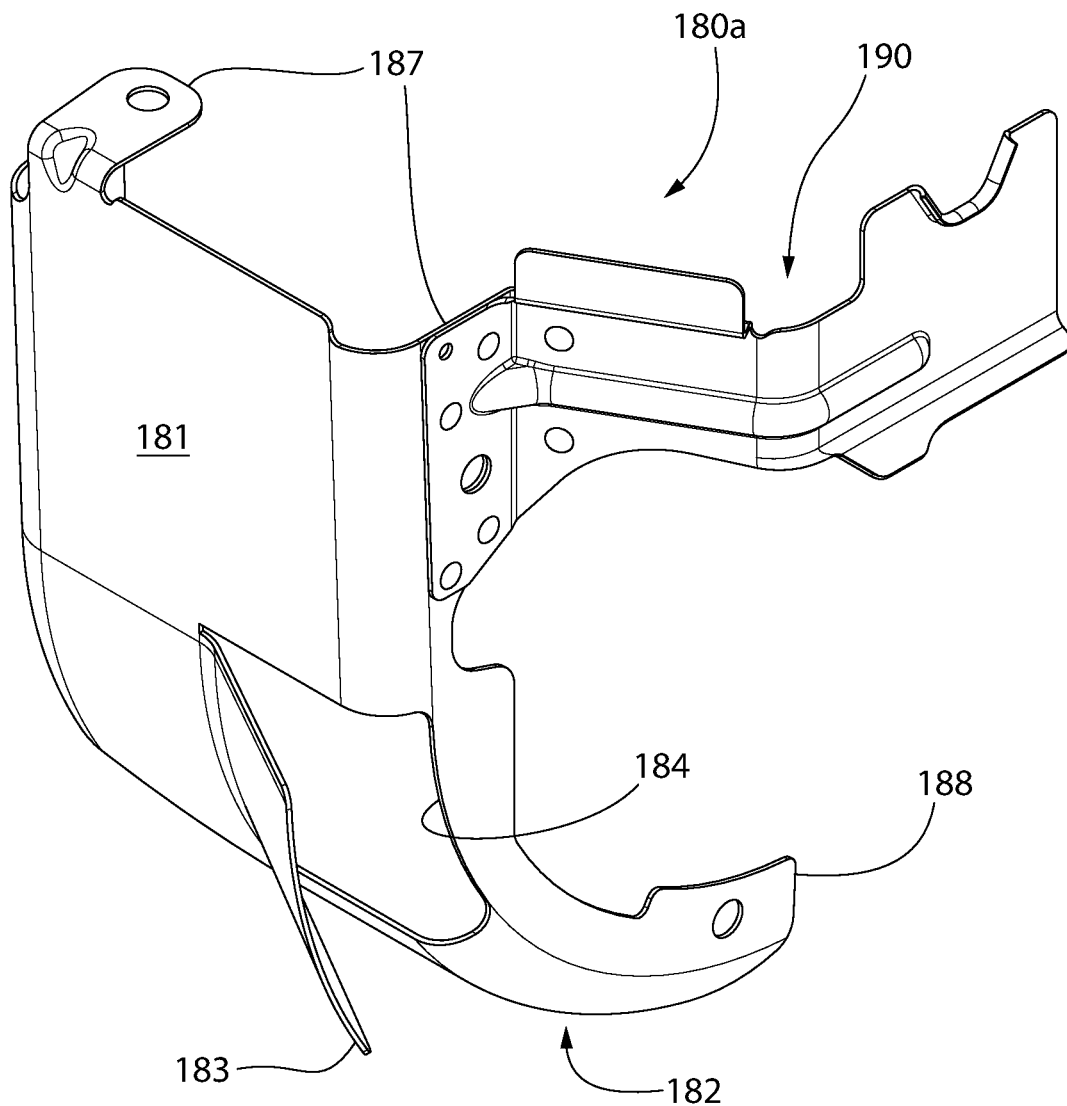
FIG. 20 is a perspective view of a first alternative design of the air control baffle.
Figure 21:
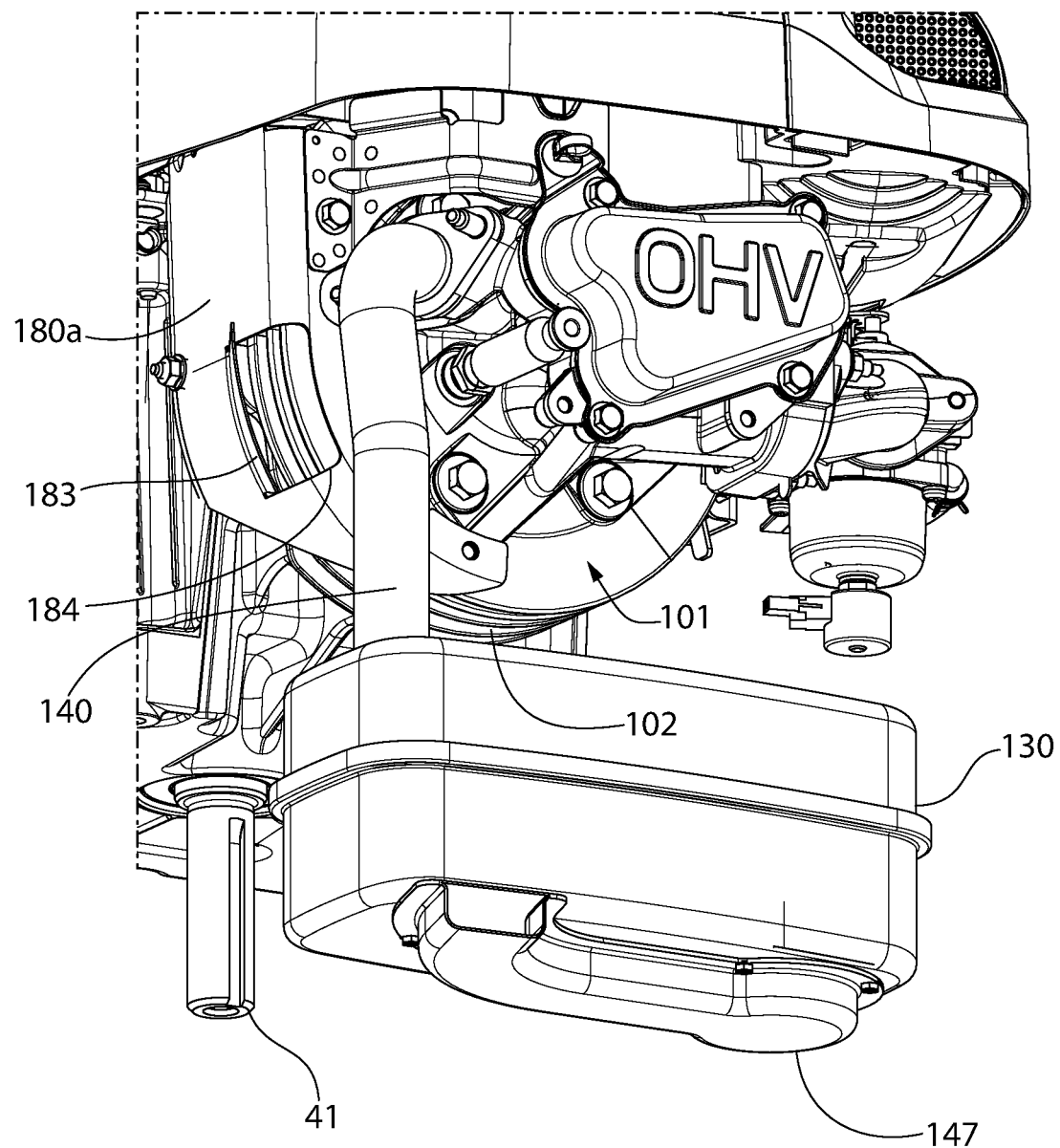
FIG. 21 is a perspective view of the first alternative design installed on the engine.

FIGS. 20-21 show a first baffle configuration, which may be referred to as a "tab baffle 180a," has a body including a sidewall 193 comprising a vertical upper portion 181 which may be planar/straight and arcuately and inwardly curved lower portion 182. Lower portion 182 is configured to wrap at least partially around the lower part of the cylinder 101/fins 102 and front portion thereof. The lower portion may include an outwardly turned and angled flap or tab 183 of material formed by the baffle body which defines a window 184. The tab may be thus be integrally formed as a bent unitary part of the air control baffle. The combination of tab and window redirects a portion of the cooling air from the blower forwards towards the exhaust header and muffler, and partially towards the lateral side of the engine and the lateral part of the vehicle frame adjoining the exhaust header and muffler.

Figure 22:
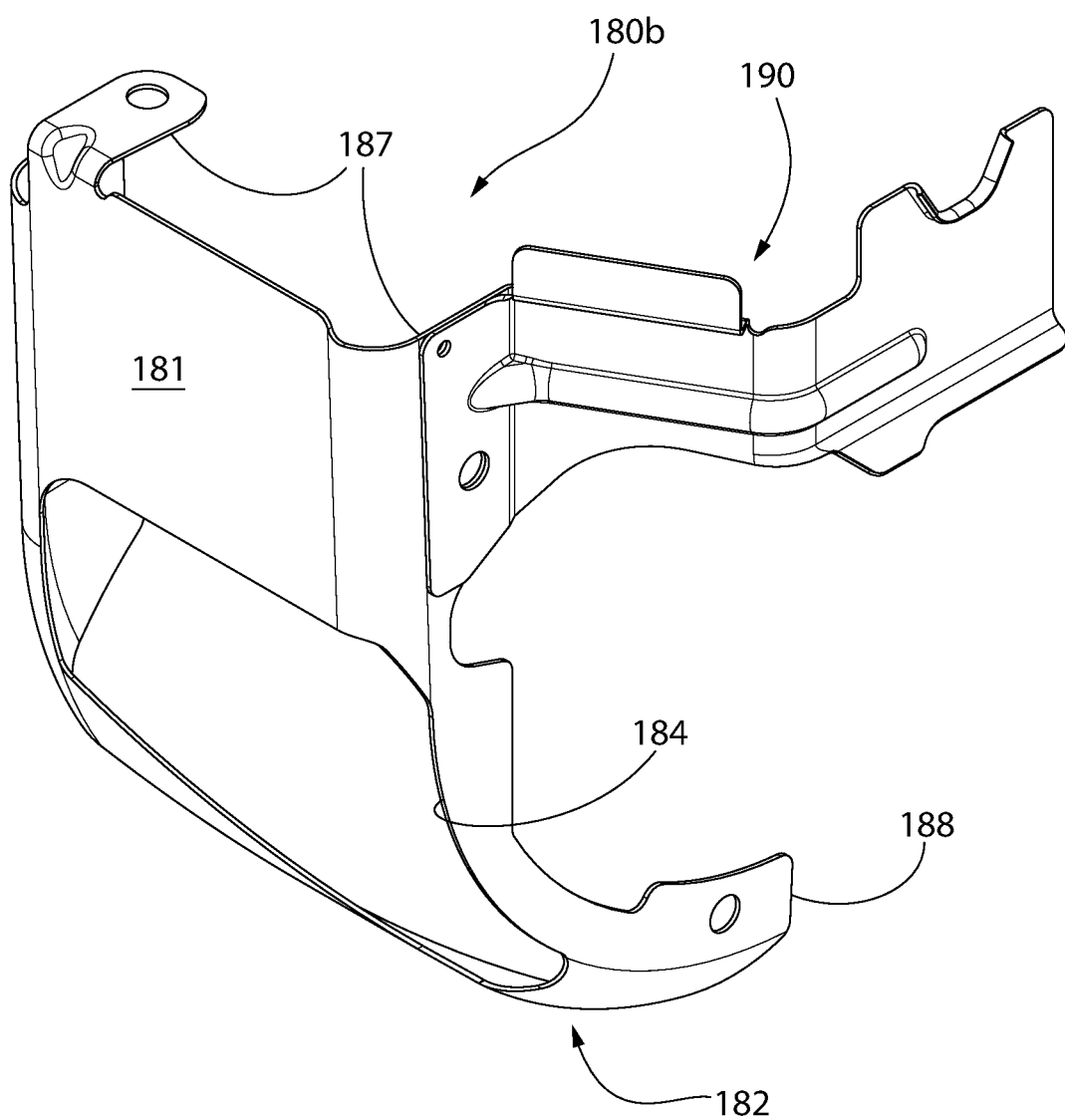
FIG. 22 is a perspective view of a second alternative design of the air control baffle.
Figure 23:
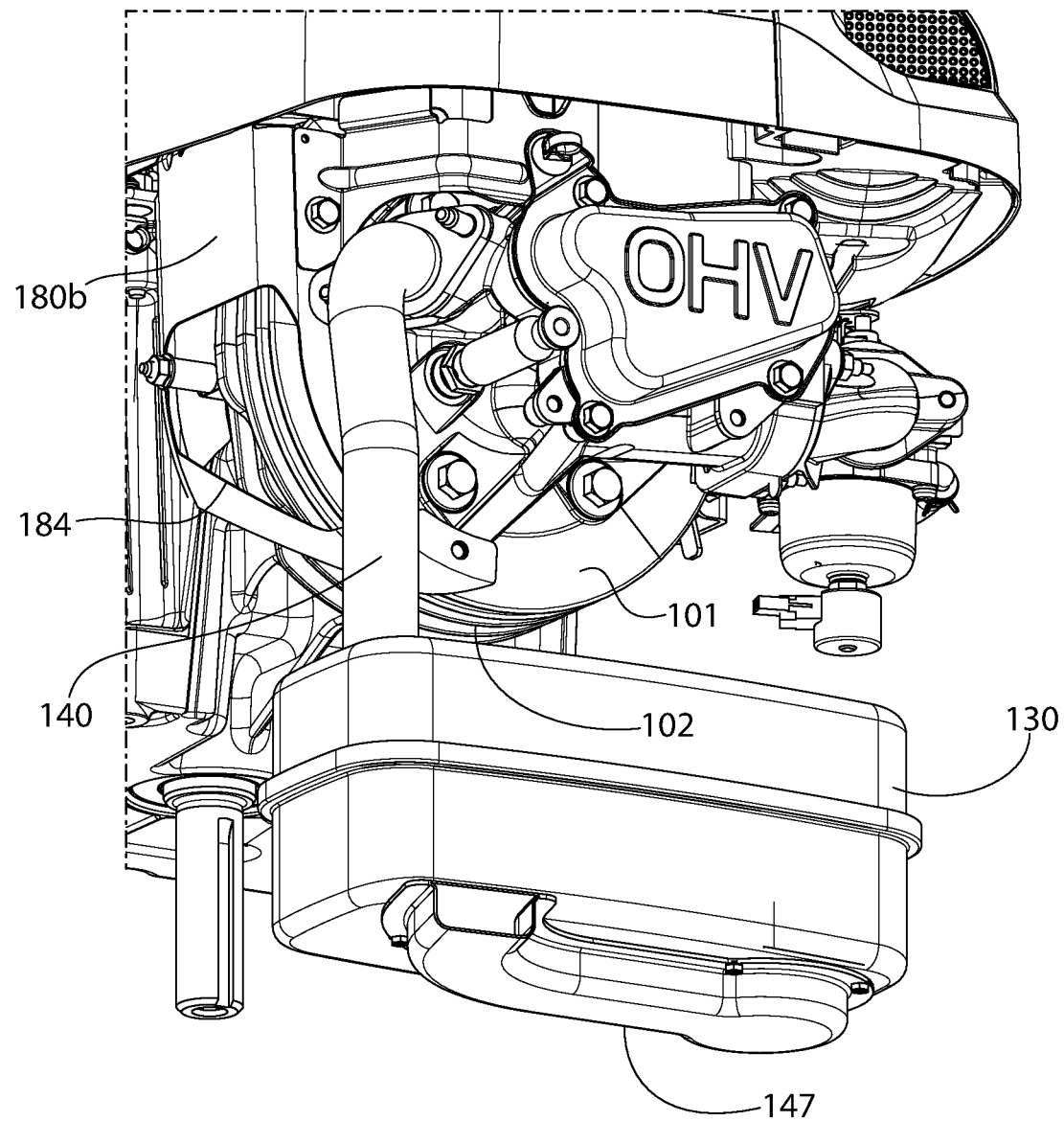
FIG. 23 is a perspective view of the second alternative design installed on the engine.

FIGS. 22-23 show a second baffle configuration, which may be referred to as an "open baffle 180b," has a body also including a sidewall 193 comprising vertical upper portion 181 which may be planar/straight and arcuately and inwardly curved lower portion 182. Lower portion 182 is configured to wrap at least partially around the lower part of the cylinder 101/fins 102 and front portion thereof. Part of the upper and lower portions may define a tab-less window 184 cut from or otherwise formed in the baffle material. The tab-less window may have a larger open area than the window of the tab baffle 180a. The larger window redirects and distributes a larger portion of the cooling air from the blower in a broader pattern forwards towards the exhaust header and muffler, and also laterally towards the lateral side of the engine and the lateral part of the vehicle frame 150 adjoining the exhaust header and muffler.

Figure 24:
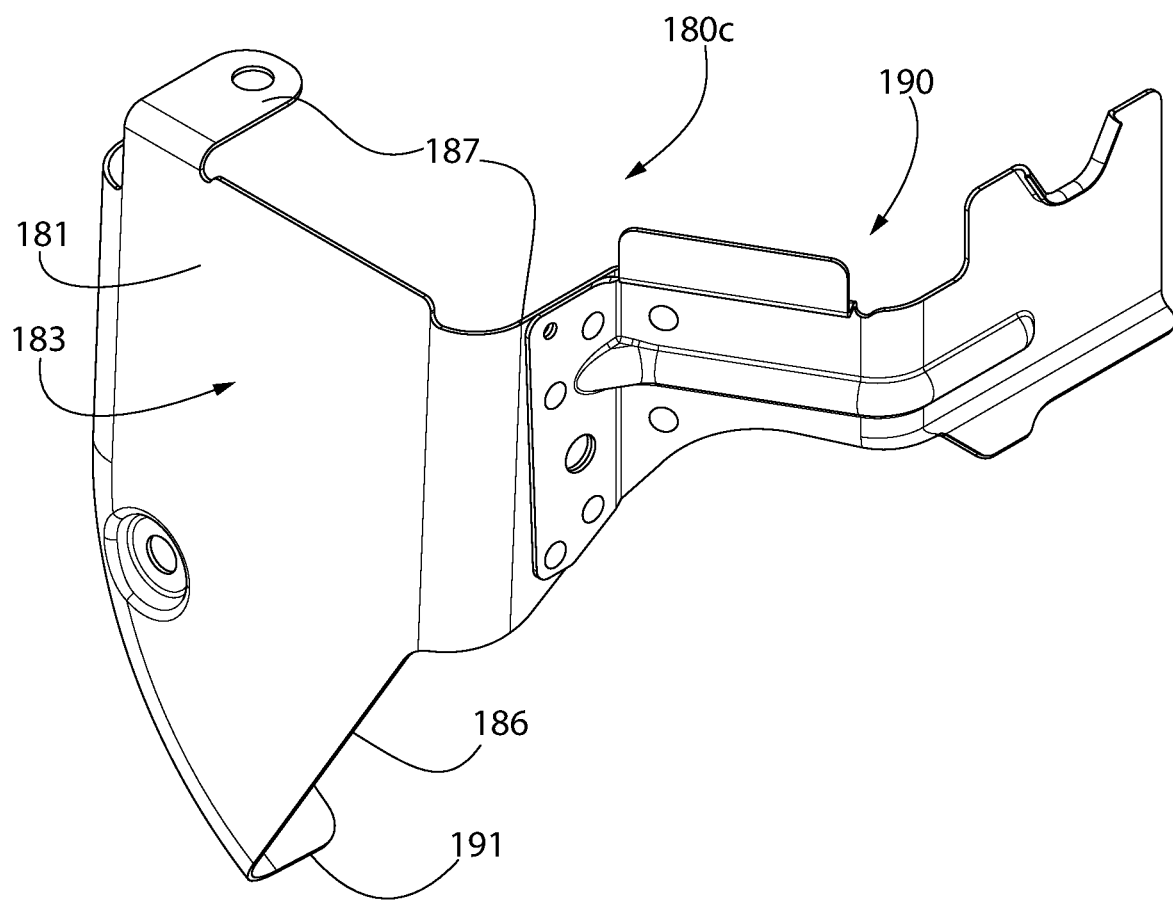
FIG. 24 is a perspective view of a third alternative design of the air control baffle.
Figure 25:
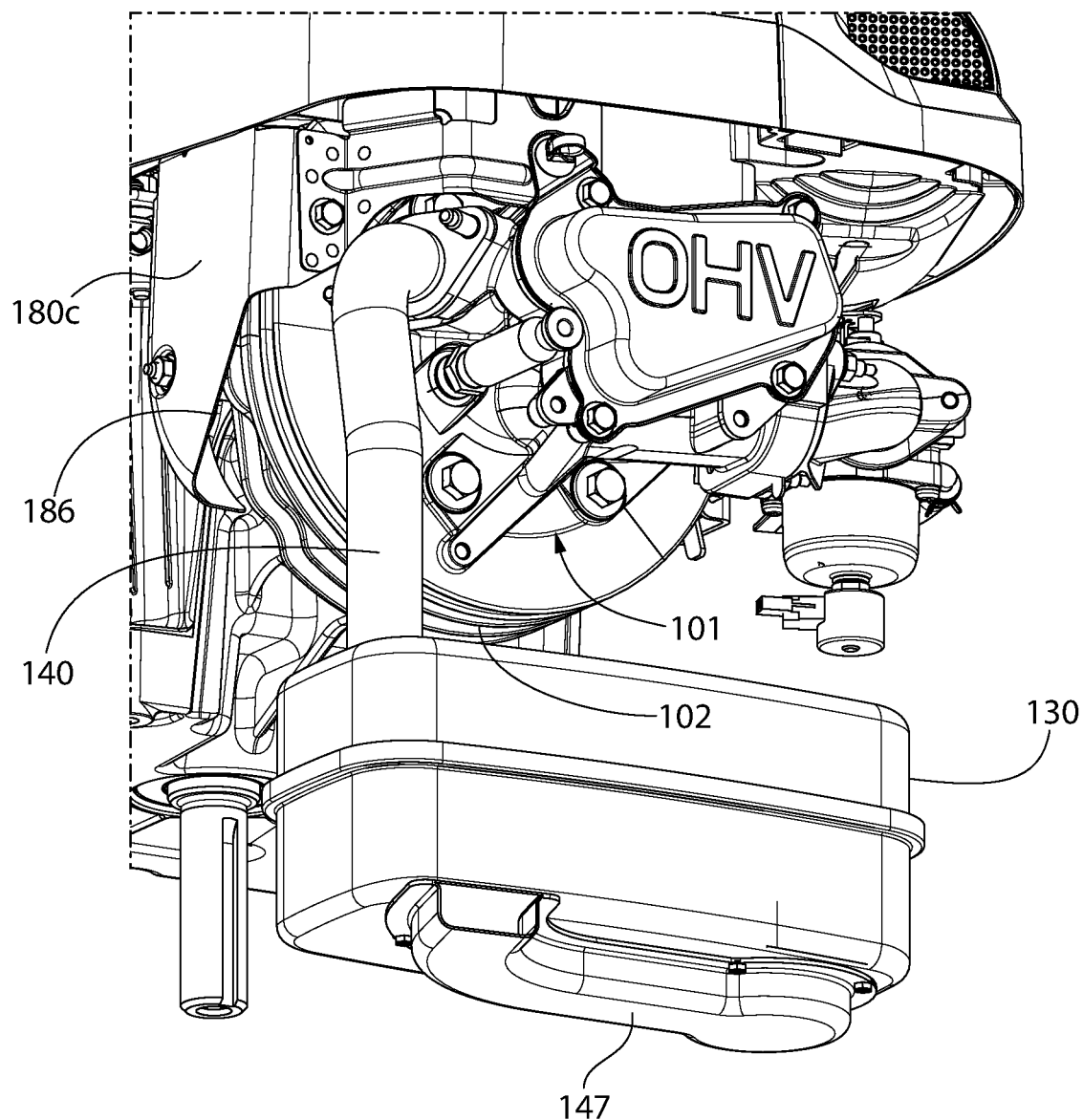
FIG. 25 is a perspective view of the third alternative design installed on the engine.
Figure 26:
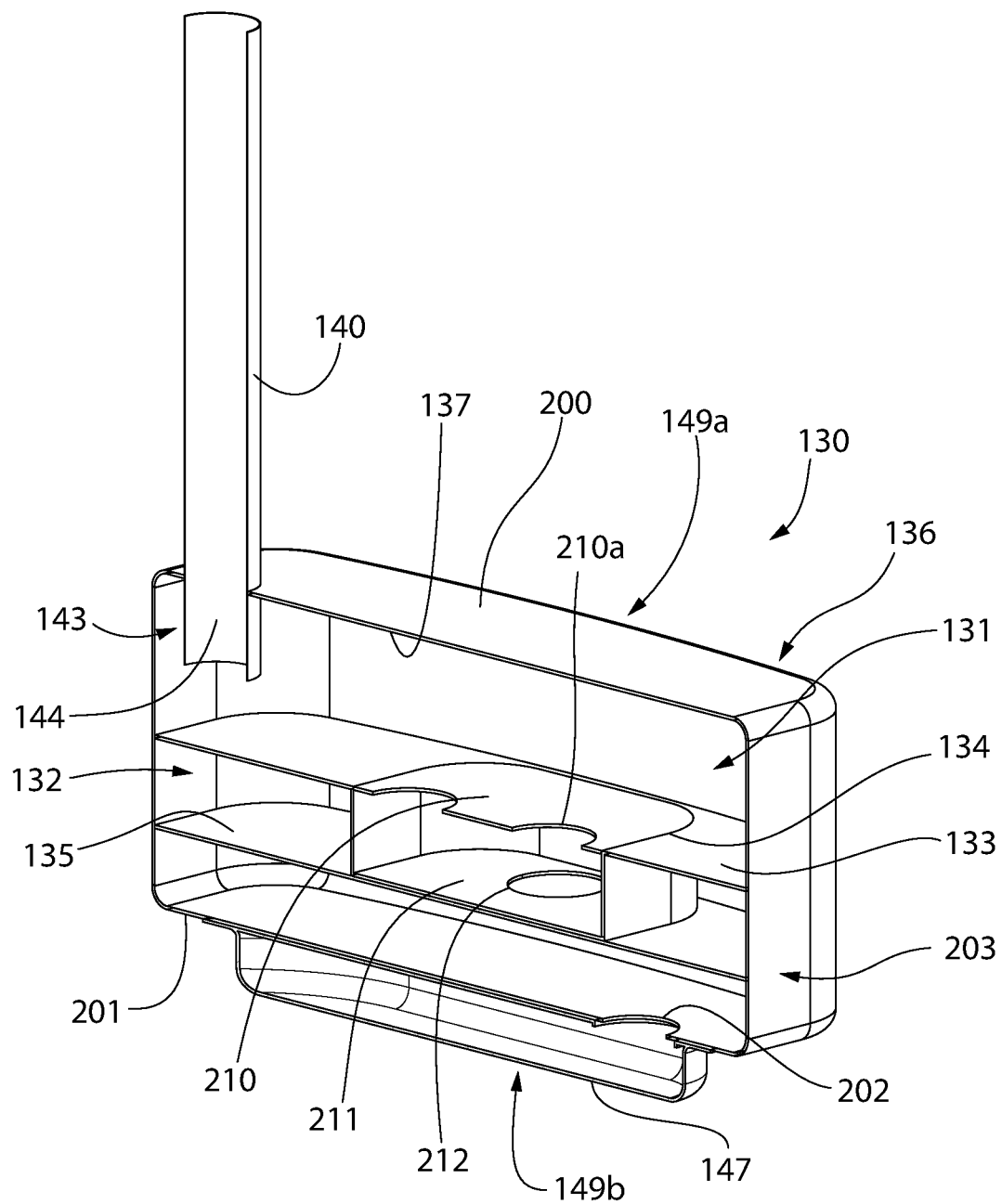
FIG. 26 is a cross-sectional perspective view of the muffler and exhaust header of the exhaust system of the engine showing a first configuration of the exhaust header outlet.
Figure 27:
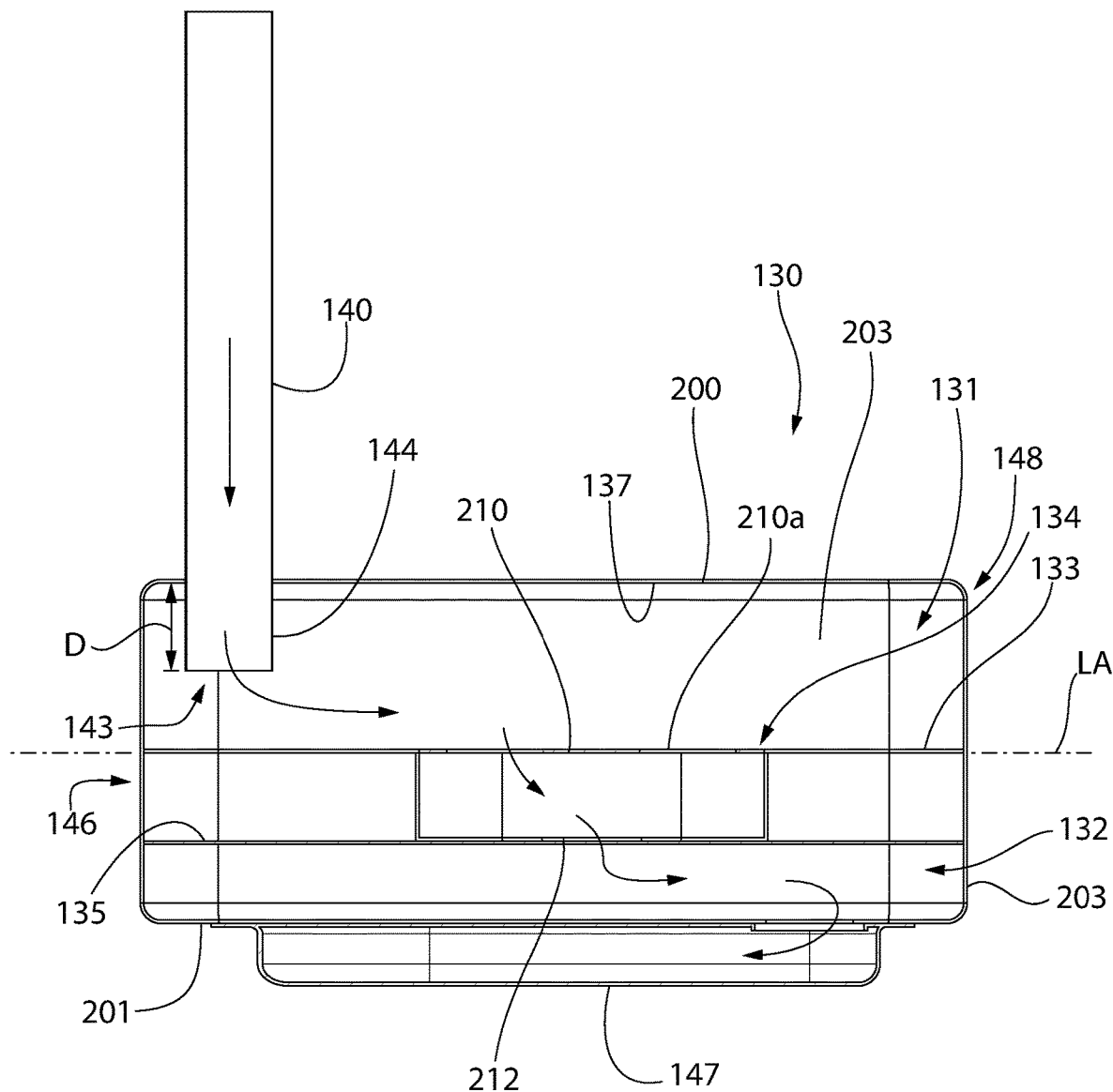
FIG. 27 is a longitudinal cross-sectional view thereof.
Figure 28:
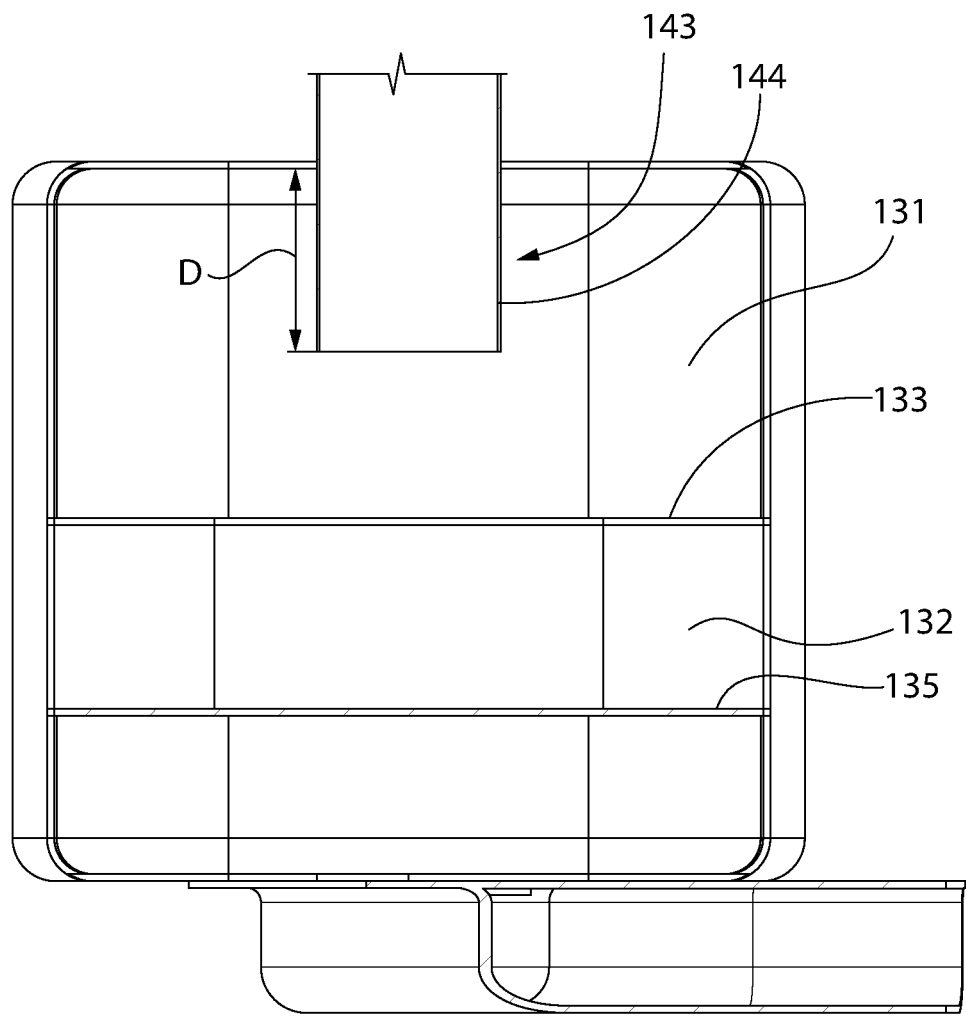
FIG. 28 is a transverse cross sectional view thereof.

A third baffle configuration shown in FIGS. 24-25, which may be referred to as an "angled baffle 180c," has a body including a sidewall 193 comprised of a solid straight vertical portion 181 defining an obliquely angled and rearwardly swept linear front edge 186. Front edge 186 defines a discharge opening arranged to discharge cooling air from the blower 110 forwards and downwards towards the exhaust header 140 and muffler 130 at the front of the engine 100. Baffle 180c may be may be shorter in longitudinal width (measured horizontally from rear of baffle to front edge) at the bottom than the top as shown. Angled baffle 180c may also be vertically shorter in height than tab and open baffles 180a and 180b, thereby covering the cylinder 101 and its cooling fins 102 to a lesser degree. Vertical side portion 181 and angled edge 186 of baffle 180c therefore does not extend substantially around the lower half of the engine cylinder/fins proximate to the bottom thereof unlike the tab and open baffle designs 180a, 180b by comparison as shown.

To better concentrate and direct the cooling air discharged by blower 110 across the cylinder 101/fins 102 towards the engine exhaust system components, angled baffle 180c further includes an inwardly turned and arcuately curved air deflector blade 191. Deflector blade 191 extends vertically from the top rear of the baffle body to the bottom end of angled front edge 186. The curvature of deflector blade 191 is in the front to rear direction of the engine 100 as shown. Deflector blade 191 prevent the cooling air discharged by blower 110 from escaping through the lower ends of the baffle 180c, thereby forcing the air to flow towards the baffle discharge opening defined by front edge 186. The angled baffle 180c is thus only forward and downwardly open (not laterally) to act as a funnel which directs cooling air from the blower at a downward angle in a direction towards the exhaust header 140 and muffler 130 in front of the engine. In some configurations, angled edge 186 may be angled between about and including 30-60 degrees to horizontal.

A fourth baffle configuration, which may be referred to as a "modified angled baffle 180d," may be generally similar in design to angled baffle 180c but has a configuration which enhances cooling the exhaust header 140 and muffler 130. This is the baffle shown in FIGS. 9-18 and in isolation in FIG. 19. Modified angled baffle 180d therefore also includes an obliquely angled and rearwardly swept linear front edge 186a, sidewall 193a with solid straight vertical portion 181a, and deflector blade 191. However, the front edge 186a is shorter in length (measured along the edge) than edge 186 of angled baffle 180c. Also notably, the body of the modified angled baffle 180d (e.g. side portion 180a) is vertically taller/longer in height so as to more completely cover and enclose the cylinder 101/cooling fins 102. This captures a greater amount of cooling air discharged vertically downwards by blower 110 across the cylinder which is then redirected by baffle 180d towards the heated engine exhaust system components. Accordingly, the vertical portion 181a and deflector blade 191 may extend substantially below the midline of cylinder 101 and cooling fins 102 terminating more proximate to the bottom of cylinder 101 and fins 102 than the angled baffle 180c. In addition, the arcuately curved and inwardly turned deflector blade 191 has a greater length (measured along the radius of curvature) than the angled baffle 180c. This prevents the cooling air generated by blower 110 from escaping downward rather than being directed more substantially towards the engine exhaust system components. Accordingly, the design of modified angled baffle 180d advantageously captures and concentrates the cooling air flow from blower 110 to a greater degree which is specifically directed at the exhaust header 140 and muffler 130. Front edge 186a defines a discharge opening arranged to discharge cooling air from the blower 110 forwards and downwards directly towards the exhaust header 140 and muffler 130 at the front of the engine 100 in a straight line path.

All of the foregoing air control baffles 180a, 180b, 180c, 180d may wrap partially around the cylinder to at least some degree conforming at least partially to the circular shape of the cooling fins 102. The baffles therefore partially enclose and encircle the cylinder 101 while discharging at least a portion of the ambient cooling air generated by blower 110 towards the exhaust system components (i.e. muffler 130 and exhaust header 140). The baffles may include angled mounting flaps or flanges which may extend partially around the front and/or rear of the cylinder and cooling fins for baffle mounting purposes. In one construction, each of the baffles may include a pair of upper mounting flanges 187 (front and rear) configured for insertion of a mounting fastener therethrough 189. Tab and open baffles 180a, 180b may further include a lower mounting flap or flange 188 due to the longer vertical height of these baffles. The flanges 187, 188 may be angled inwards and oriented 90 degrees to the main body (e.g. sidewall 193) of the baffles in some implementations.

It bears noting that the front upper mounting flange 187 of the modified angled baffle 180d has a greater vertical height/length than the angled baffle 180c. For example, the front upper mounting flange of modified angled baffle 180d may extend downwards at least to the midline of engine cylinder 101 in some implementations while the front upper mounting flange of angled baffle 180c may terminate above the midline. The longer length of the front upper mounting flange 187 of modified angled baffle 180d captures and redirects a greater amount (volume) of ambient cooling air from blower 110 towards the exhaust header 140 and muffler 130 to enhance cooling the engine exhaust system.

For engines in which the cylinder 101 is axially aligned front to rear on the engine as shown, the baffles 180 may be mounted on a lateral side of the engine closest to the exhaust header 140 and muffler 130 since this is where cooling airflow for the exhaust system is needed. Baffles 180 may be mounted to the cylinder block 118, cylinder 101, or a combination thereof. In the illustrated engine example, the cylinder, exhaust header and muffler are located at the front side 104 of the engine and the baffles are shown located on the left side 107 of the cylinder proximate to the exhaust header and muffler. Other arrangements of the baffles of course may be used depending on the engine configuration, and the location and orientation of the cylinder or cylinders.

A suitably configured engine mounting bracket 190 may optionally be provided for mounting air control baffles (180 (180a, 180b, 180c, or 180d) to engine block 118 and/or cylinder 101 in addition to the integrally formed mounting flanges 187, 188 previously described herein. In some implementations, the mounting flanges 187, 188 on the baffles may be used entirely for mounting the baffles to the engine without a bracket 190. In either scenario, the baffles are supported directly or indirectly by the engine 100. In one construction, the baffles may be mounted to the engine by bracket 190 via threaded fasteners 189; however, other mounting and support options may be used. The baffles may be formed of any suitable metallic material, such as steel, aluminum, or other. Brackets 190 may have any suitable configuration necessary to effectuate the baffle mounting based on the engine configuration, layout, and available mounting space. In the illustrated design, mounting brackets 190 may be considered to be generally L-shaped overall.

The baffles may be directly mounted to the brackets 190, which in turn are mounted to the engine block and/or engine cylinder.

Brackets 190 may be used to mount the vertical upper portions 181 of the baffles to the engine and provide substantially support for the baffles. Brackets 190 may be fastened to one of the upper mounting flanges 187 (e.g. front ones) of the baffles for this purpose. The remaining upper mounting flanges 187 (e.g. rear ones) and lower mounting flanges 188 of the tab and open baffles 180a, 180b provide supplemental support to help secure the baffles in place.

It will be appreciated that the air control baffles 180 may be configured and located as needed to accommodate numerous variations of engine configurations and possible mounting scenarios.

According to another aspect, the physical and fluid coupling interface between the muffler 130 and exhaust header 140 according to the present disclosure is configured to improve the hot exhaust gas flow and heat distribution through the muffler. Advantageously, this ameliorates and/or eliminates localized hot spots on the muffler, which is close enough to the outermost protective shield (e.g. Browning Shield) to overheat portions of the protective shield. This can cause the exposed surface of the Browning Shield to exceed the 176 degrees F. maximum temperature limit of the ANSI/OPEI B71.1-2017 industry standard. Exhaust gas entering the muffler may exceed 1400 degrees F. (Fahrenheit) in some cases, thereby creating a significant source of heat and hot spots on the muffler and nearby Browning Shield.

The exhaust header 140 which conveys the heated exhaust gas from the engine may have an inlet end 141 connected to a header mounting flange 142 on the engine block 118 and an outlet end 143 forming a gas inlet and fluid coupling to the muffler 130. Inlet end 141 may include a mating complementary configured mounting flange 142a for fastening to engine header mounting flange 142 via threaded fasteners 142b. Conventional (baseline) muffler designs have an exhaust header gas outlet that terminates at the outer surface of the first inlet chamber of the muffler. The header may not typically penetrate the muffler at all and instead is connected to an external piping nipple on the exterior surface of the muffler. This arrangement results in less than desirable gas flow and heat distribution in the muffler, thereby creating localized high temperature "hot spots" on the outer muffler skin (outer surface) at the gas inlet connection. These hot spot areas radiates heat towards the frame 150 of the vehicle and most notably to the outermost protective shield 160 (e.g. Browning shield) in front causing physically corresponding localized hot spots thereon which may exceed the foregoing industry hot surface temperature safety standards.

Referring to FIGS. 26-38, the muffler 130 with improved heat distribution may generally comprise a horizontally elongated hollow body or shell 136 including a top wall 200, bottom wall 201, pair of end walls 202, and pair of lateral sidewalls 203. The shell 136 defines cavity or interior 137. Muffler 130 includes internal gas flow direction features comprising an upper inlet chamber 131, lower outlet chamber 132, and an elongated center baffle 133 which physically divides the interior horizontally into the upper inlet and lower outlet chambers. The inlet and outlet chambers are in fluid communication through a central opening 134 in the center baffle. Center baffle 133 may include a recessed lower portion 211 defined by perimetrically continuous sidewalls and a flat floor. The floor of baffle 133 further defines a secondary gas flow opening 212 in fluid communication with outlet chamber 132 and inlet chamber 131. A gas flow guide plate 210 may be provided in the upper inlet chamber 131 which is fitted into or over and covers central opening 134 of center baffle 133. One or more primary gas flow openings 210a are provided through guide plate 210 which allows gas to flow from inlet chamber 131 into recessed lower portion of center baffle 133 before entering outlet chamber 132 through opening 212 in center baffle 133. Guide plate 210 prevents a substantial amount of exhaust gas initially entering the muffler from short circuiting directly into the lower outlet chamber 132, thereby forcing a portion of the gas to flow towards distal end 148 of muffler 130 for better gas and concomitantly heat distribution inside the muffler.

Outlet chamber 132 of muffler 130 may include an elongated lower baffle 135 extending for the full length and width of the muffler interior. The outlet end 143 of exhaust header 140 is located at a first proximal end 146 of the muffler on top 149a whereas the muffler outlet 202 leading into the muffler exhaust conduit 147 may be located more distally towards the opposite second distal end 148 thereof at bottom 149b of muffler 130 to maximize resonance time of the gas in the muffler and cooling before discharge to the environment. Accordingly, the engine exhaust header 140 enters the inlet chamber 131 adjacent to the proximal end 146 whereas the muffler exhaust conduit 147 is fluidly coupled adjacent to the distal end 148 of the muffler. Exhaust header 140 may have any suitable configuration and orientation.

The gas exhaust header 140 of engine 100 according to the present disclosure is modified in two ways to achieve the improved gas flow and heat distribution in the inlet chamber of the new muffler 130 which reduces hot spots on the Browning Shield (i.e. outermost protective shield 170). In a first aspect, the outlet end 143 of the exhaust header 140 which forms the muffler gas inlet penetrates the outer muffler body or shell 136 and extends a predetermined distance or insertion depth D into the internal cavity or interior 137 of the gas upper inlet chamber 131 (see, e.g. FIGS. 27-28). This forms an outlet extension 144 of the exhaust header outlet end 143 positioned internally within the muffler interior 137. The outlet end 143 penetrates and enters the muffler perpendicularly to the exterior surface (top wall 200) of muffler shell 136 and longitudinal axis LA of the elongated muffler. In one implementation, the outlet extension 144 of the exhaust header 140 may extend about 1 inch or more (i.e. insertion depth) for insertion depth D into upper inlet chamber 131 of muffler 130. Other insertion depths less than 1 inch may be used however depending on the size of the muffler and configuration of its internal components.

In a second aspect of the exhaust header 140 modification for improved heat control, the exhaust header outlet extension 144 may include a lateral discharge opening 145 which faces at least partially towards the far end (distal end 148) of the upper inlet chamber 131 of muffler 130. Since the gas inlet is typically introduced at one end of the elongated muffler inlet chamber, the present gas inlet with lateral discharge opening steers the gas flow away from immediately impinging the center baffle 133 of the muffler and entering the enlarged central opening 134 therein. Instead, lateral discharge opening 145 directs gas entering muffler 130 away from central opening 134 and towards the far end of upper inlet chamber 131. This sharply contrasts to conventional muffler gas inlet designs which typically have a gas inlet pipe which is cut straight across the pipe end and may terminate at or near the exterior surface of the muffler shell or body. Gas in the conventional design directly impinges the center baffle and creates turbulent flow with significant recirculation, all of which contributes to poor overall flow and heat distribution within the inlet chamber making the inlet end particularly hot. The addition of the about 1 inch insertion depth of the exhaust header outlet end extension 144 and laterally oriented discharge opening 145 advantageously removes or substantially reduces the internal gas flow recirculation and improves the temperature distribution in upper inlet chamber 131. This advantageously reduces localized heat buildup at the exhaust gas inlet end of the chamber 131.

Figure 29:
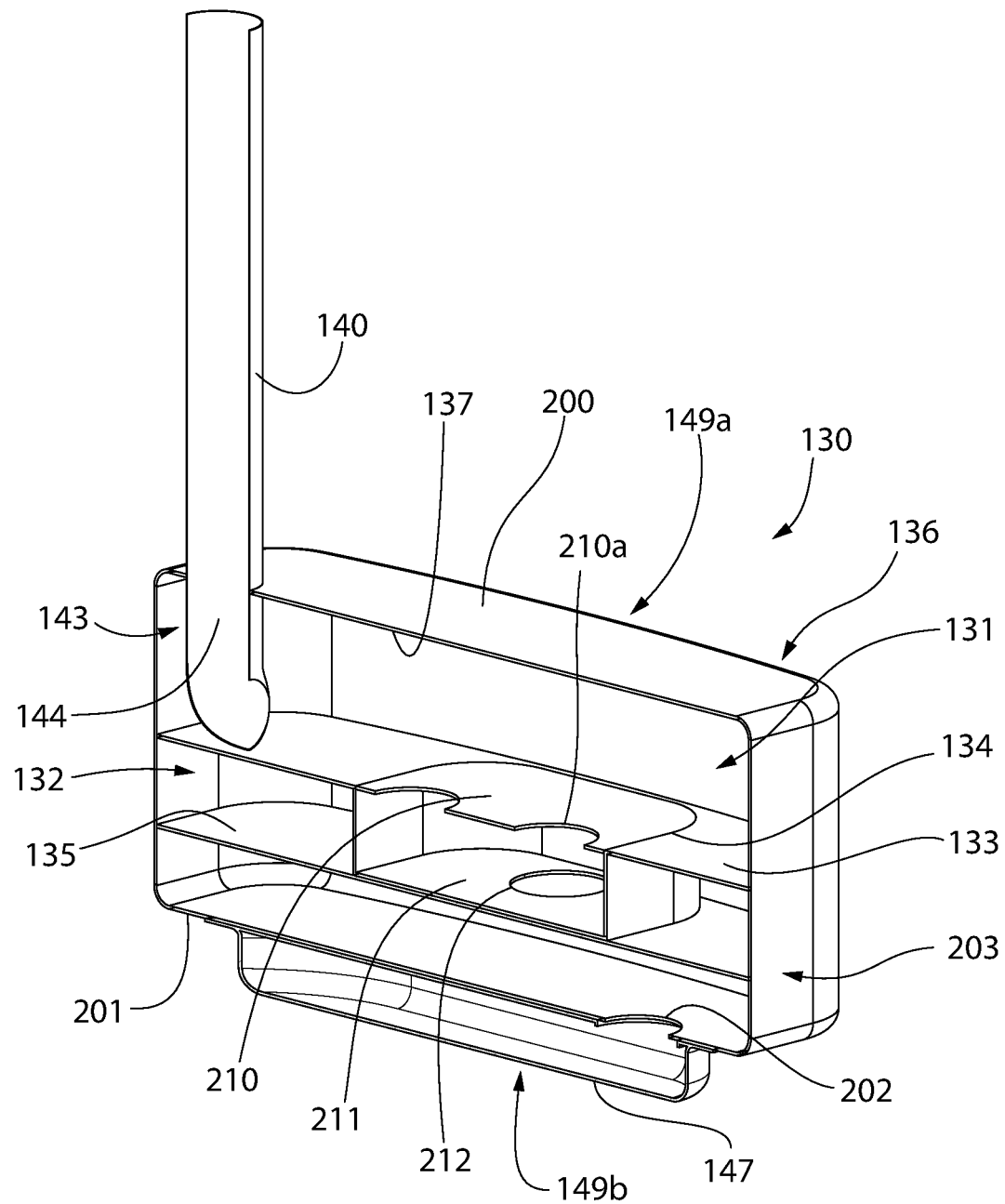
FIG. 29 is a cross-sectional perspective view of the muffler and exhaust header of the exhaust system of the engine showing a second configuration of the exhaust header outlet.
Figure 30:
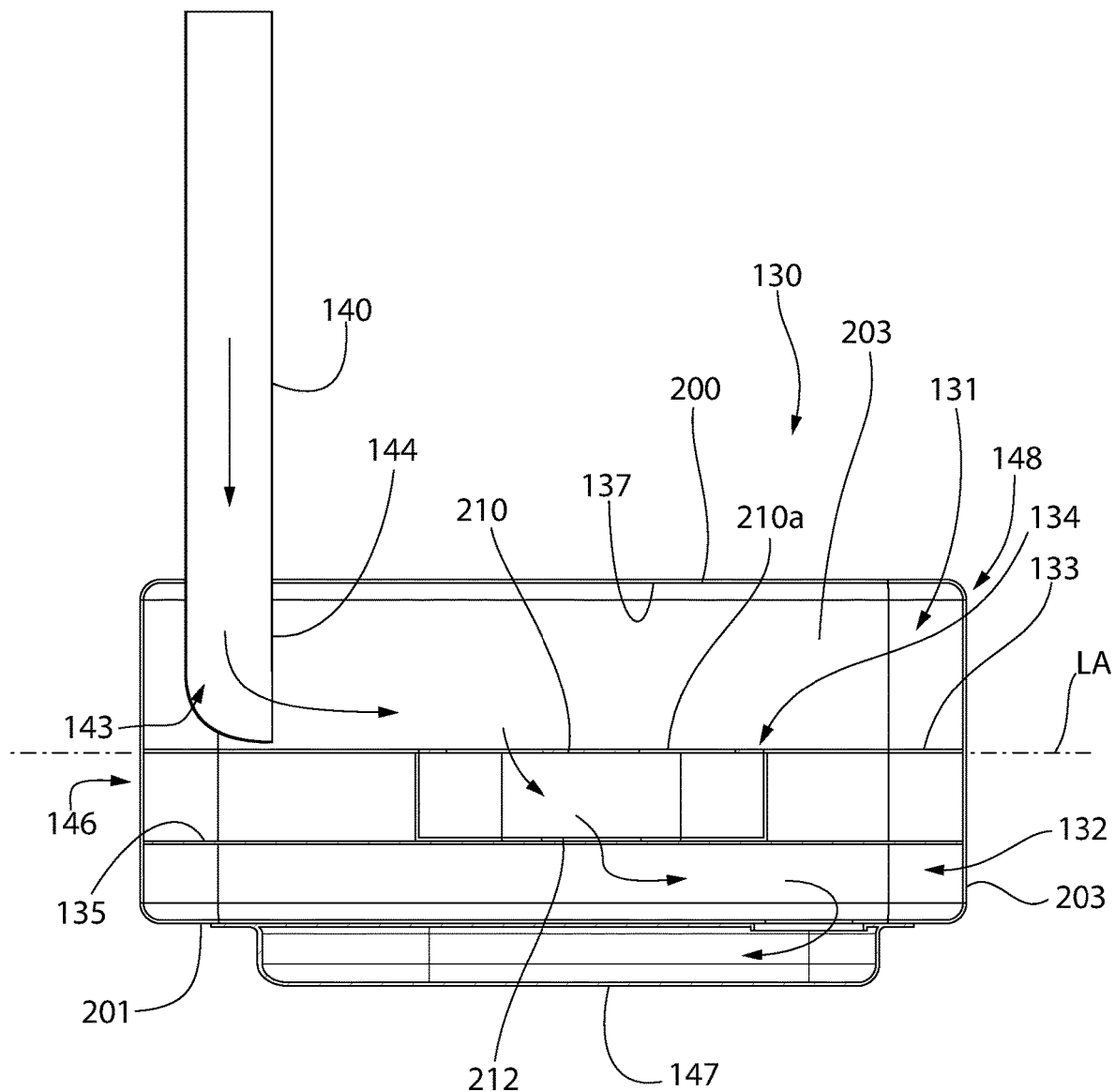
FIG. 30 is a side cross-sectional view thereof.
Figure 31:
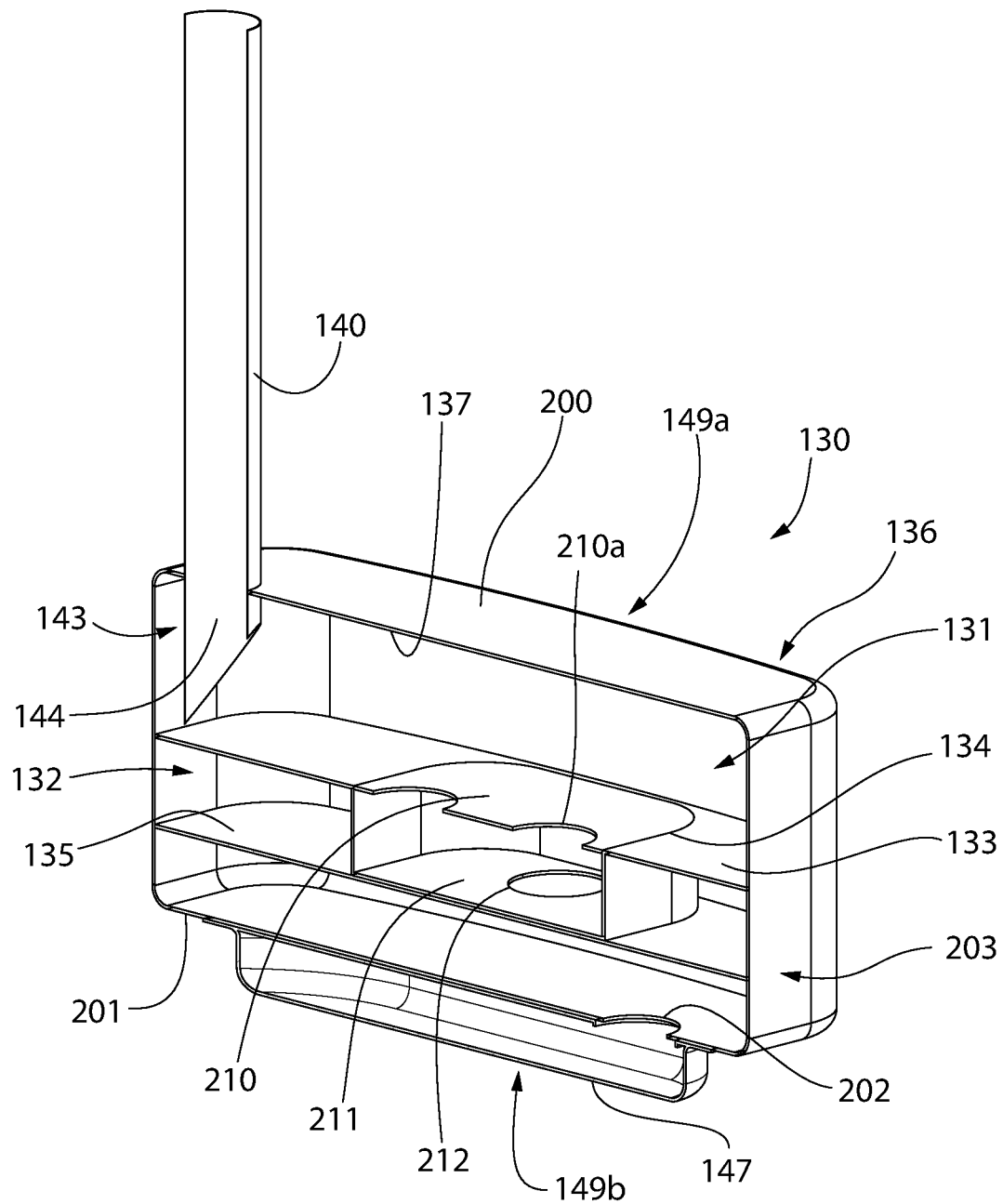
FIG. 31 is a cross-sectional perspective view of the muffler and exhaust header of the exhaust system of the engine showing a third configuration of the exhaust header outlet.
Figure 32:
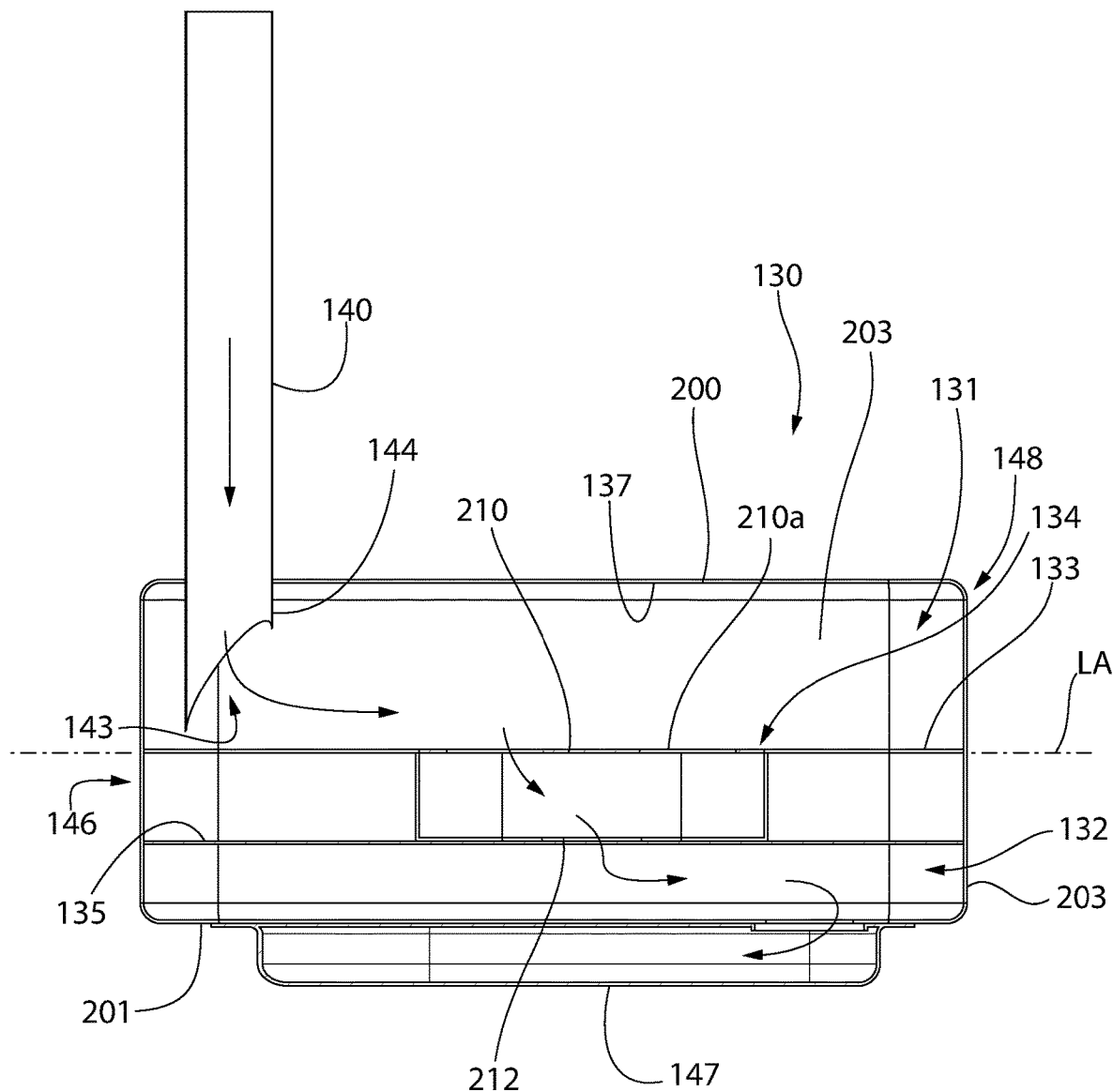
FIG. 32 is a side cross-sectional view thereof.
Figure 33:
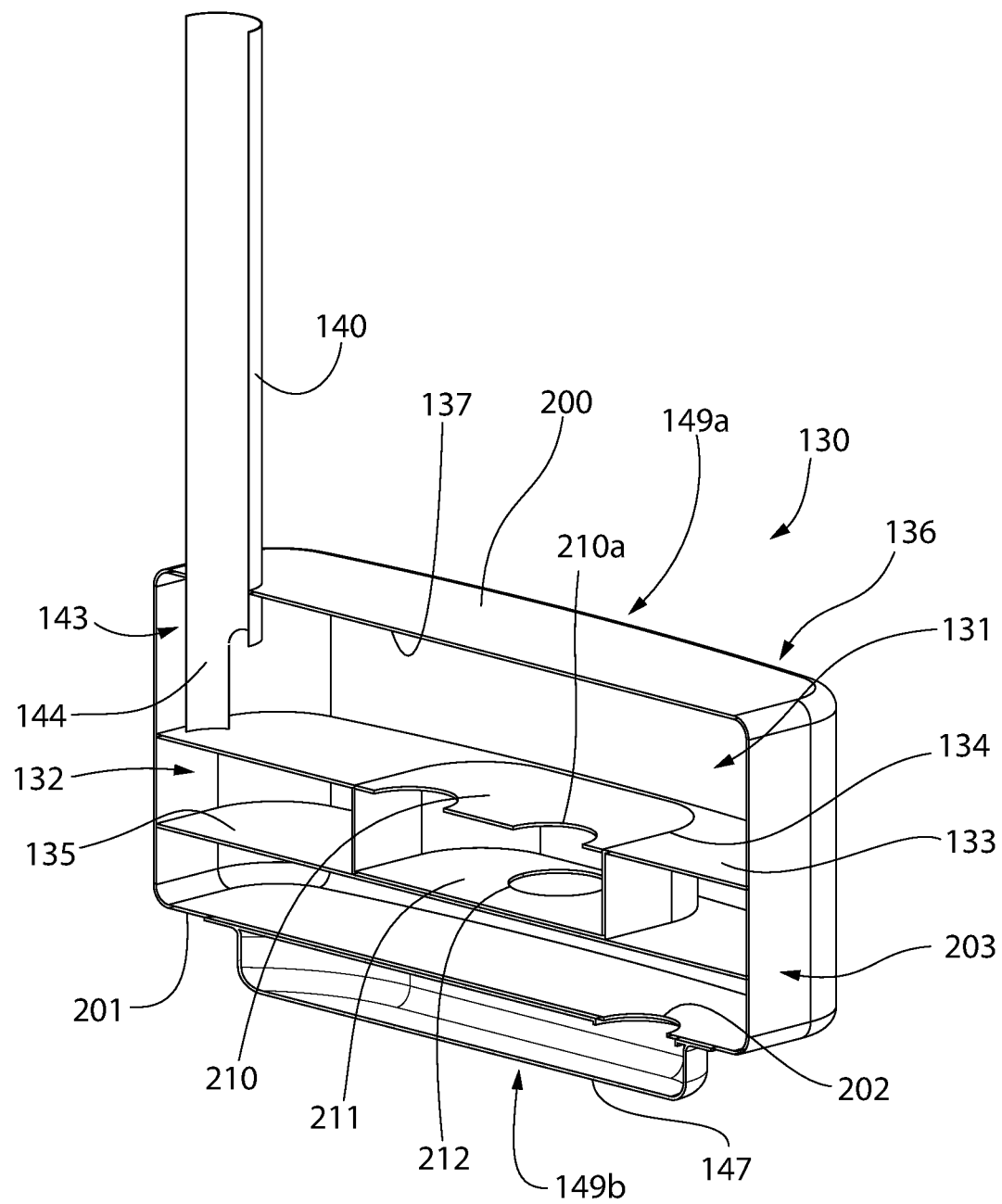
FIG. 33 is a cross-sectional perspective view of the muffler and exhaust header of the exhaust system of the engine showing a fourth configuration of the exhaust header outlet.
Figure 34:
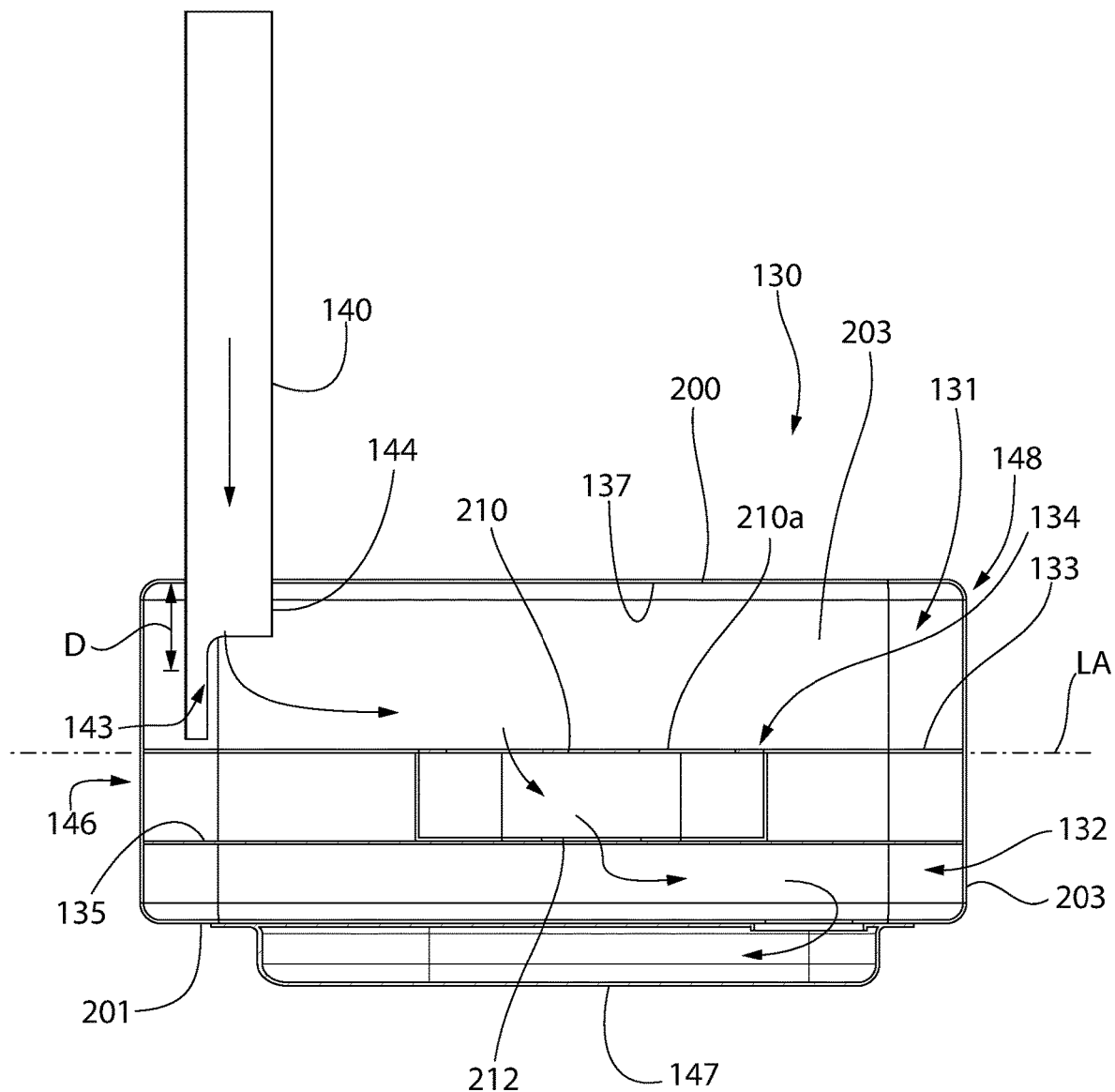
FIG. 34 is a side cross-sectional view thereof.

The improved exhaust header outlet (muffler gas inlet), or more specifically outlet extension 144 thereof with lateral discharge opening 145, may have numerous configurations which provide the desired lateral discharge opening and transverse exhaust gas flow pattern through upper inlet chamber 131 of muffler 130. Several examples of muffler extension 144 for forming lateral discharge opening 145 are shown in the accompanying figures including without limitation a straight angle cut end (FIGS. 31-32) and a square cut half-opening cut end which creates a laterally open window (FIGS. 33-34) by removing an arcuate segment of the exhaust header outlet end extension 144. Another example comprises a full circular lateral discharge opening formed by a 90 degree bend shaped exhaust header outlet extension 144 (FIGS. 29-30). Other exhaust header outlet end configurations may be used so long as a lateral discharge opening is provided.

Computer heat and gas flow distribution modeling indicated that the present exhaust header outlet design provides more uniform heat distribution and flow through the muffler to eliminate the typical hot spot typically created at the gas entry region or inlet end of the upper inlet chamber 131 compared to the baseline conventional muffler and gas inlet arrangement without the exhaust header outlet extension 144 inserted into the muffler 130 and lateral discharge opening 145. Overall muffler temperature (e.g. outer surface/skin) is advantageously lower with the present engine exhaust header outlet end design and muffler interface. Additionally, elimination of the gas inlet hot spot in turn also keeps the adjacent-most portion of the outermost protective shield 160 from overheating and increasing in temperature which exceed the industry safety standards previously described herein.

As previously noted, the heat management system may be used and adapted for engines having two or more cylinders. A double or twin cylinder engine may be fitted with heat management system components previously described herein including one or more of the inner heat shield 170 and any of the variations of air control baffle 180 depending on the location and configuration of the muffler and engine exhaust header. The outlet end of the exhaust header may also be modified to include extension 144 including the muffler insertion depth D (e.g. about 1 inch or more) and lateral discharge opening 145 described above. Multiple cylinder engines typically utilize a single muffler.

While the foregoing description and drawings represent examples of the present invention, it will be understood that various additions, modifications and substitutions may be made therein without departing from the spirit and scope and range of equivalents of the accompanying claims. In particular, it will be clear to those skilled in the art that the present invention may be embodied in other forms, structures, arrangements, proportions, sizes, and with other elements, materials, and components, without departing from the spirit or essential characteristics thereof. In addition, numerous variations in the methods/processes as applicable described herein may be made without departing from the spirit of the invention. One skilled in the art will further appreciate that the invention may be used with many modifications of structure, arrangement, proportions, sizes, materials, and components and otherwise, used in the practice of the invention, which are particularly adapted to specific environments and operative requirements without departing from the principles of the present invention. The presently disclosed examples are therefore to be considered in all respects as illustrative and not restrictive, the scope of the invention being defined by the appended claims and equivalents thereof, and not limited to the foregoing description or examples. Rather, the appended claims should be construed broadly, to include other variants of the invention, which may be made by those skilled in the art without departing from the scope and range of equivalents of the invention.

What is claimed is:

1. An engine exhaust heat management system comprising:
   an engine;
   a blower configured to blow ambient cooling air across the engine;
   an exhaust header having an inlet end configured to receive heated exhaust gas from the engine;
   a muffler fluidly coupled to an outlet end of the exhaust header; and
   an air control baffle configured to redirect a portion of the cooling air from the blower towards the exhaust header and the muffler, the air control baffle coupled directly to a cylinder of the engine.

2. The system according to claim 1, wherein the blower blows cooling air across the cylinder of the engine.

3. The system according to claim 2, wherein the cylinder comprises external cooling fins.

4. The system according to claim 2, wherein the air control baffle is configured to wrap at least partially around the cylinder.

5. The system according to claim 2, wherein the air control baffle comprises a vertical sidewall defining an obliquely angled and rearwardly swept edge which defines a discharge opening configured to discharge cooling air from the blower towards the exhaust header and the muffler.

6. The system according to claim 5, wherein the air control baffle further comprises an arcuately curved deflector blade configured to funnel air towards the discharge opening of the air control baffle.

7. The system according to claim 6, wherein the discharge opening faces forwards and downwards towards the exhaust header and muffler.

8. The system according to claim 6, wherein the air control baffle is shorter in longitudinal width at a bottom than at a top.

9. The system according to claim 2, wherein the air control baffle comprises planar upper portion and an arcuately curved lower portion, the lower portion including a window configured to discharge the cooling air towards the exhaust header and the muffler.

10. The system according to claim 9, wherein air control baffle further comprises an outwardly turned angled tab disposed adjacent to the window, the tab being configured to steer the cooling air from the window towards the exhaust header and the muffler.

11. The system according to claim 1, further comprising an outermost protective shield positioned adjacent to the muffler.

12. The system according to claim 11, further comprising an inner heat shield disposed between the muffler and the outermost protective shield.

13. The system according to claim 12, wherein the outermost protective shield and the inner heat shield are attached to a frame of a vehicle powered by the engine.

14. The system according to claim 1, wherein the outlet end of the exhaust header comprises an extension which projects inwards into and is disposed in an internal cavity of the muffler.

15. The system according to claim 14, wherein the extension comprises a lateral opening configured to discharge the exhaust gas into the cavity of the muffler at an angle to the exhaust gas entering the extension.

16. An engine exhaust heat management system comprising:
   a vehicle having a frame;
   an engine mounted to the frame;
   a blower configured to blow ambient cooling air across the engine;
   an outermost protective shield mounted to the frame and spaced apart from the engine;
   an exhaust header having an inlet end mounted to the engine and configured to receive heated exhaust gas from the engine;
   a muffler fluidly coupled to an outlet end of the exhaust header; and
   an air control baffle configured to redirect a portion of the cooling air from the blower towards the exhaust header and the muffler, the air control baffle having an arcuate shape which at least partially surrounds a cylinder of the engine.

17. The system according to claim 16, wherein the muffler is supported by the frame proximate to the outermost protective shield.

18. The system according to claim 17, further comprising an inner heat shield mounted to the frame between the muffler and the outermost protective shield.

19. An engine exhaust heat management system comprising:
   an engine;
   an exhaust header having an inlet end mounted to the engine and configured to receive heated exhaust gas from the engine;
   a muffler comprising an elongated shell defining an interior including an inlet chamber having a proximal end portion fluidly coupled to an outlet end of the exhaust header, an outlet chamber in fluid communication with the inlet chamber, and a center baffle arranged between the inlet and outlet chambers, the center baffle including an opening extending between the inlet and outlet chambers;
   wherein the outlet end of the exhaust header includes an extension which projects through the shell and inwards into the inlet chamber for a distance; and
   wherein the extension comprises a lateral opening configured to direct gas from the exhaust header towards a distal end portion of the inlet chamber opposite to the proximal end portion.

* * * * *